(12) United States Patent
Ko et al.

(10) Patent No.: US 10,747,345 B2
(45) Date of Patent: Aug. 18, 2020

(54) SENSOR, TOUCH SENSOR, AND DISPLAY DEVICE

(71) Applicant: Samsung Display Co., Ltd., Yongin-si (KR)

(72) Inventors: Jun Young Ko, Yongin-si (KR); Dong Gun Park, Yongin-si (KR); Jin Oh Kwag, Yongin-si (KR); Young Sik Kim, Yongin-si (KR); Tae Joon Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/352,355

(22) Filed: Nov. 15, 2016

(65) Prior Publication Data

US 2017/0220162 A1   Aug. 3, 2017

(30) Foreign Application Priority Data

Jan. 29, 2016   (KR) .................. 10-2016-0011532

(51) Int. Cl.
*G06F 3/041*   (2006.01)
*G06F 3/044*   (2006.01)
*G06F 3/045*   (2006.01)

(52) U.S. Cl.
CPC ............ *G06F 3/0412* (2013.01); *G06F 3/044* (2013.01); *G06F 3/045* (2013.01); *G06F 3/0414* (2013.01);

(Continued)

(58) Field of Classification Search
CPC ...... G06F 3/041; G06F 3/0412; G06F 3/0414; G06F 3/044; G06F 3/045; G06F 3/04144; G06F 3/04146
See application file for complete search history.

(56) References Cited

U.S. PATENT DOCUMENTS 9,001,082 B1   4/2015 Rosenberg et al.
9,297,831 B2   3/2016 Ahn et al.
(Continued)

FOREIGN PATENT DOCUMENTS

KR   10-2013-0067183   6/2013
KR   10-2013-0098311   9/2013
(Continued)

OTHER PUBLICATIONS https://senselblog.wordpress.com, posted from Jun. 16, 2015 to Sep. 22, 2016, 17 pages.
(Continued)

*Primary Examiner* — Alexander Eisen
*Assistant Examiner* — Cory A Almeida
(74) *Attorney, Agent, or Firm* — H.C. Park & Associates, PLC

(57) ABSTRACT

A display device includes a display panel and a first sensor configured to sense a position of a touch of a user and a second sensor configured to sense a pressure of the touch. The first sensor and the second sensor may be provided inside or surrounding an area of the display panel. The second sensor includes a first conductor, a second conductor spaced apart from the first conductor, and configured to form capacitance with the first conductor, and one or more variable resistance elements connected with the first conductor.

20 Claims, 21 Drawing Sheets

(52) U.S. Cl.
CPC .............. *G06F 2203/04101* (2013.01); *G06F 2203/04102* (2013.01); *G06F 2203/04105* (2013.01); *G06F 2203/04111* (2013.01); *G06F 2203/04112* (2013.01)

(56) References Cited

U.S. PATENT DOCUMENTS

| | | |
|---|---|---|
| 2006/0197753 A1 | 9/2006 | Hotelling |
| 2012/0089348 A1 | 4/2012 | Perlin et al. |
| 2012/0228110 A1* | 9/2012 | Takahashi ............... G06F 3/044 200/600 |
| 2013/0181726 A1 | 7/2013 | Viallet et al. |
| 2013/0257787 A1 | 10/2013 | White et al. |
| 2013/0275057 A1 | 10/2013 | Perlin et al. |
| 2014/0152579 A1* | 6/2014 | Frey ......................... G06F 3/044 345/173 |
| 2014/0176490 A1* | 6/2014 | Zhou ..................... G06F 3/0412 345/174 |
| 2014/0347076 A1* | 11/2014 | Barton .................. G06F 3/0488 324/663 |
| 2014/0354617 A1 | 12/2014 | Nam et al. |
| 2015/0153895 A1 | 6/2015 | Hotelling |
| 2015/0370376 A1 | 12/2015 | Harley et al. |
| 2015/0370396 A1 | 12/2015 | Hotelling et al. |
| 2015/0370398 A1 | 12/2015 | Perlin et al. |
| 2016/0103544 A1* | 4/2016 | Filiz ..................... G06F 3/0414 345/174 |

FOREIGN PATENT DOCUMENTS

| | | |
|---|---|---|
| KR | 10-1459307 | 11/2014 |
| KR | 10-2014-0141843 | 12/2014 |
| KR | 10-1572432 | 11/2015 |
| WO | 2015/123322 | 8/2015 |
| WO | WO2015123322 * | 8/2015 |

OTHER PUBLICATIONS

The Extended European Search Report dated May 26, 2017, issued in European Patent Application No. 17153224.5.

EP Office Action No. 17153224.5 corresponding to U.S. Appl. No. 15/352,355.

* cited by examiner

SENSOR, TOUCH SENSOR, AND DISPLAY DEVICE

CROSS-REFERENCE TO RELATED APPLICATION

This application claims priority from and the benefit of Korean Patent Application No. 10-2016-0011532, filed on Jan. 29, 2016, which is hereby incorporated by reference for all purposes as if fully set forth herein.

BACKGROUND

Field

Exemplary embodiments generally relate to a display device having a touch sensor for controlling image display functions and, more particularly, to a display device having a sensor that recognizes the position of and pressure generated by a user's touch.

Discussion of the Background

Due to an increase in interests in displaying information and an increase in demand for using portable information media, research and development efforts have been focused on display devices.

A recent display device includes a touch sensor activated by a touch of a user together with an image display function. Accordingly, a user is capable of more conveniently using the display device through the touch sensor.

Further, there has been a trend for such display devices desires to provide various functions to a user by recognizing the pressure generated by a touch, as well as location or touch position on the display screen. To date, providing such sensing functions in a display device has been complex and difficult to integrate.

The above information disclosed in this Background section is only for enhancement of understanding of the context of the inventive concept, and, therefore, it may contain information that does not form the prior art that is already known to a person of ordinary skill in the art.

SUMMARY

To meet the foregoing need and avoid the above drawbacks, the inventive concepts provide for better integration of both the pressure and location sensing functions into one sensor. For instance, according to the exemplary embodiments of the inventive concepts, it is possible to provide a sensor capable of easily recognizing an intensity of a user's touch. It also is possible for the inventive sensor to recognize a point (location) of a touch and the intensity of the touch at the same time. A display device may incorporate a sensor and/or touch sensor having these features.

Accordingly, an exemplary embodiment of the inventive concepts provides a display device including a display panel and a first sensor configured to sense a position of a touch of a user and a second sensor configured to sense a pressure of the touch. The first sensor and the second sensor may be provided inside or surrounding an area of the display panel. The second sensor includes a first conductor, a second conductor spaced apart from the first conductor, and configured to form capacitance with the first conductor, and one or more variable resistance elements connected with the first conductor.

The variable resistance elements may have capacitance and resistance and the capacitance and resistance of at least one of the variable resistance elements may be changed in accordance with the pressure applied by the user's touch The one or more variable resistance elements may be positioned on the first conductor or between the first conductor and the second conductor.

The first conductor may be positioned between the one or more variable resistance elements and the second conductor.

At least some of the variable resistance elements may be provided on the same layer as that of the first conductor.

The one or more variable resistance elements may include nano particles. The nano particle may include at least one of a nano column, a nano rod, a nano pore, a nano wire, a silver nano wire, and a carbon nano tube.

The first conductor may have a mesh structure, and may include metal lines including a plurality of openings.

The metal lines may include a first metal line and a second metal line which are spaced apart from each other and the one or more variable resistance elements may be connected between the first metal line and the second metal line.

The openings may include a first opening and a second opening positioned farther from a center of the first conductor than the first opening. A size of the second opening may be smaller than that of the first opening.

The first sensor and the second sensor may be positioned overlapping each other.

The display panel may include a first surface and a second surface opposite to the first surface, and the first sensor and the second sensor may be positioned on the first surface of the display panel.

The display panel may display an image through the first surface and may be positioned between the first sensor and the second sensor.

A buffer member may be positioned between the first conductor and the second conductor. The buffer member may have an elastic force, and include a plurality of sub-buffer members which may be separate from each other.

The number of variable resistance elements may be two or more and may be disposed along an edge of the first conductor.

The variable resistance elements may be regularly or irregularly disposed in the first conductor, and may be disposed along a non-linear path.

A density of the variable resistance elements may be changed as the distance from the center of the first conductor increases.

The first sensor may be a capacitive sensor.

The display device may also include a bracket configured to accommodate the display panel, the first sensor, and the second sensor. The second conductor may be part of the bracket accommodating the display panel, the first sensor, and the second sensor.

According to another exemplary embodiment of the inventive concepts, a touch sensor includes a first sensor configured to sense a position of a touch of user on the sensor and a second sensor configured to sense a pressure of the user's touch. The second sensor may include a first conductor, a second conductor spaced apart from the first conductor and configured to form capacitance with the first conductor, and one or more variable resistance elements connected with the first conductor.

According to another exemplary embodiment of the inventive concepts a sensor includes a first conductor, a second conductor spaced apart from the first conductor and configured to form capacitance with the first conductor, and one or more variable resistance elements connected with the first conductor. The one or more variable resistance elements may have capacitance and resistance which change in accordance with a pressure applied to the sensor from the outside.

In yet another exemplary embodiment of the inventive concepts a sensor includes a plurality of conductors including a first conductor and a variable resistance element connected with the first conductor. The inherent-capacitance of the first conductor and resistance of the variable resistance element may be changed in accordance with a pressure applied from the outside the sensor.

Additional aspects of the inventive concepts will be set forth in the detailed description which follows, and, in part, will be apparent from the disclosure, or may be learned by practice of the inventive concepts.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
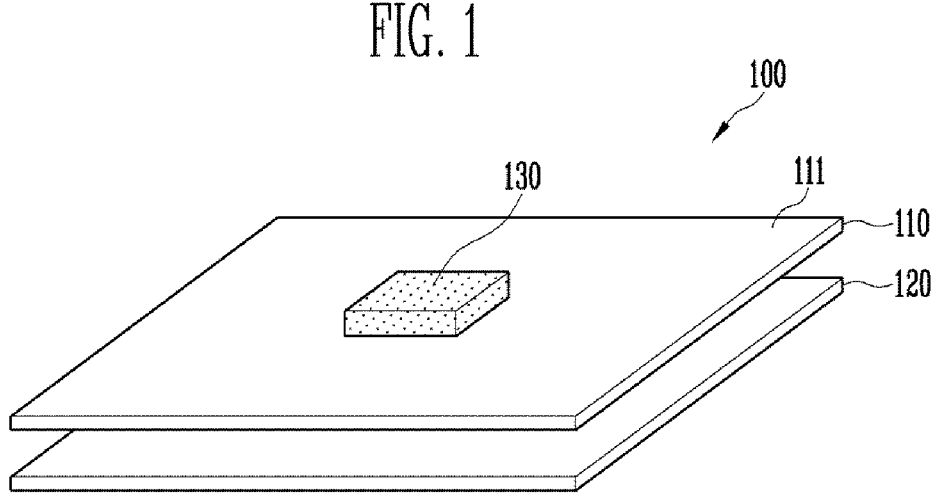
FIG. 1 is a diagram illustrating a sensor constructed according to an exemplary embodiment of the inventive concepts.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. Unless specified, processes are not limited to the order as described. For example, two consecutively described processes may be performed in the order as described, substantially at the same time, or in an order opposite than described. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the inventive concepts.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a diagram illustrating a sensor constructed according to an exemplary embodiment of the inventive concepts.

Referring to FIG. 1, a sensor 100 according to one exemplary embodiment of the inventive concepts may include a first conductor 110, a second conductor 120, and a variable resistance element 130.

The first conductor 110 and the second conductor 120 may be spaced apart from each other.

Further, a separate constituent element may be positioned between the first conductor 110 and the second conductor 120.

The first conductor 110 and the second conductor 120 include a conductive material. The conductive material may include a metal or an alloy thereof. The metal may include gold (Au), silver (Ag), aluminum (Al), molybdenum (Mo), chrome (Cr), titanium (Ti), nickel (Ni), neodymium (Nd), copper (Cu), and platinum (Pt).

The first conductor 110 and the second conductor 120 may be formed of a transparent conductive material. The transparent conductive material may include a silver nano wire (AgNW), an Indium Tin Oxide (ITO), an Indium Zinc Oxide (IZO), an Antimony Zinc Oxide (AZO), an Indium Tin Zinc Oxide (ITZO), a Zinc Oxide (ZnO), a Tin Oxide (SnO$_2$), a carbon nano tube, and a graphene. The first conductor 110 and the second conductor 120 may be formed of a single layer or multiple layers, for example, multiple layers, in which two or more materials among the materials are stacked.

The first conductor 110 and the second conductor 120 are illustrated in plate shapes in the drawing, but are not limited thereto and may have various shapes.

Further, the second conductor 120 may be formed of the same material as that of the first conductor 110 or a different material.

The variable resistance element 130 may be connected to the first conductor 110. For example, the variable resistance element 130 may be disposed on an upper surface 111 of the first conductor 110.

FIG. 1 illustrates a case where one variable resistance element 130 $x$ is connected to the first conductor 110, but a plurality of variable resistance elements 130 may also be connected to the first conductor 110.

Further, the variable resistance element 130 is a constituent element having an electric characteristic that changes according to the degree of change or modification of the element, and its resistance may be changed in response to a pressure or force applied from the outside.

For example, as pressure applied to the variable resistance element 130 is increased, the resistance of the variable resistance element may be decreased. Alternatively, as pressure applied to the variable resistance element 130 is increased, the resistance of the variable resistance element may be increased.

The variable resistance element 130 may include a material, of which resistance is changed according to pressure. For example, the variable resistance element 130 may include materials referred to as a force sensitive material or a force sensitive resistor.

The variable resistance element 130 may include nano particles. The nano particles may be in a form of a nano tube, a nano column, a nano rod, a nano pore, a nano wire, and the like. The nano particles may include particles of carbon, graphite, a metalloid, a metal, a conductive oxide of the metalloid or the metal, and a conductive nitride of the metalloid or the metal, or include particles in a core shell structure, in which the particles are coated on an insulating bead, or a combination thereof. The metalloid may include any one of antimony (Sb), germanium (Ge), and arsenic (As), or an alloy thereof. The metal may include a zinc (Zn), aluminum (Al), scandium (Sc), chrome (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy thereof. The conductive oxide may include an indium tin oxide (ITO), an indium zinc oxide (IZO), an aluminum doped zinc oxide (AZO), a gallium indium zinc oxide (GIZO), a zinc oxide (ZnO), and a mixture thereof.

The nano particle may be any one of a carbon nano tube and a silver nano wire, but is not limited thereto.

Further, the shape of the variable resistance element 130 is not limited to the shape illustrated in FIG. 1, and may be variously changed.

Figure 2A:
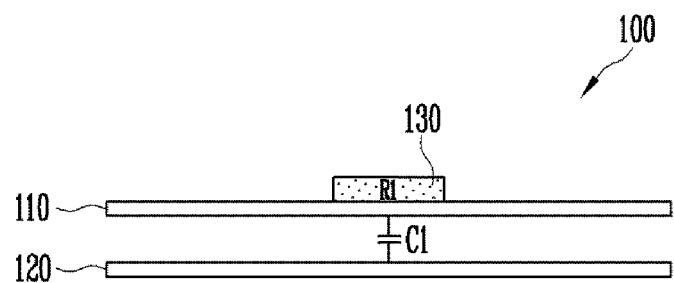
FIGS. 2A and 2B are diagrams for describing an operation of the sensor illustrated in FIG. 1.
Figure 2B:
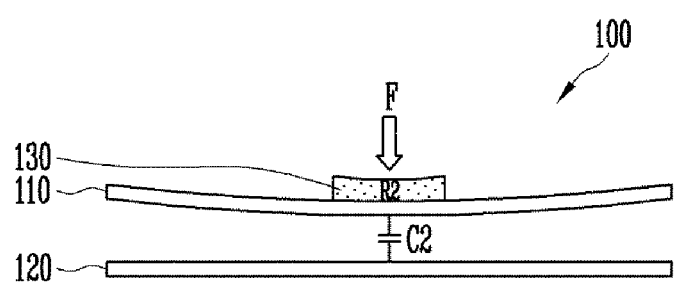

FIGS. 2A and 2B are diagrams for describing an operation of the sensor illustrated in FIG. 1. Particularly, FIG. 2A illustrates a state where a pressure F (see FIG. 2B) is not applied to the sensor 100, and FIG. 2B illustrates a state where a pressure F is applied to the sensor 100.

Referring to FIG. 2A, when the pressure F is not applied to the sensor 100, a first capacitance C1 is formed between the first conductor 110 and the second conductor 120, and the variable resistance element 130 may have a first resistance R1.

Referring to FIG. 2B, when the pressure F is applied to the sensor 100 according to a touch of a user and the like, a distance between the first conductor 110 and the second conductor 120 is changed, and thus, the capacitance between the first conductor 110 and the second conductor 120 may be changed. For example, the first capacitance C1 may be changed to a second capacitance C2 by the applied pressure F.

Further, when the pressure F is applied to the sensor 100, the form of the variable resistance element 130 is changed, and thus resistance of the variable resistance element 130 may be changed. For example, the first resistance R1 may be changed to a second resistance R2 by the applied pressure F.

As a result, the mutual capacitance of the first conductor 110 and the second conductor 120 and the resistance of the variable resistance element 130 may be changed in response to the pressure F applied from the outside.

Accordingly, it is possible to detect an intensity of the pressure F, and the like, by using the change or variation in the amount of the capacitance and the change or variation in the amount of the resistance generated in the sensor 100.

The pressure F applied to the sensor may be generated by the touch of the user, but is not limited thereto, and may be generated by other various means.

Generally, detecting only change in capacitance may have a disadvantage in that it may be vulnerable to surface noise (e.g., moisture), and detecting only the change in resistance may has a disadvantage in that it may be vulnerable to a temperature change and it is impossible to detect a hovering type touch which is defined as a touch created by little or no direct physical contact ("hover").

However, it is possible to detect both a change in capacitance and in resistance through a hybrid structure, in which the first conductor 110 and the variable resistance element 130 are combined as described above, so that it may be possible to overcome the disadvantages of both types of detection schemes.

That is, detecting the change in capacitance may be reliably operated in an environment with noise, such as underwater, in the presence of excess moisture, and in the presence of foreign substances, and may still detect all of the input schemes (a finger, a stylus, a touch in a state where a user wearing a glove, and a hover).

Figure 3:
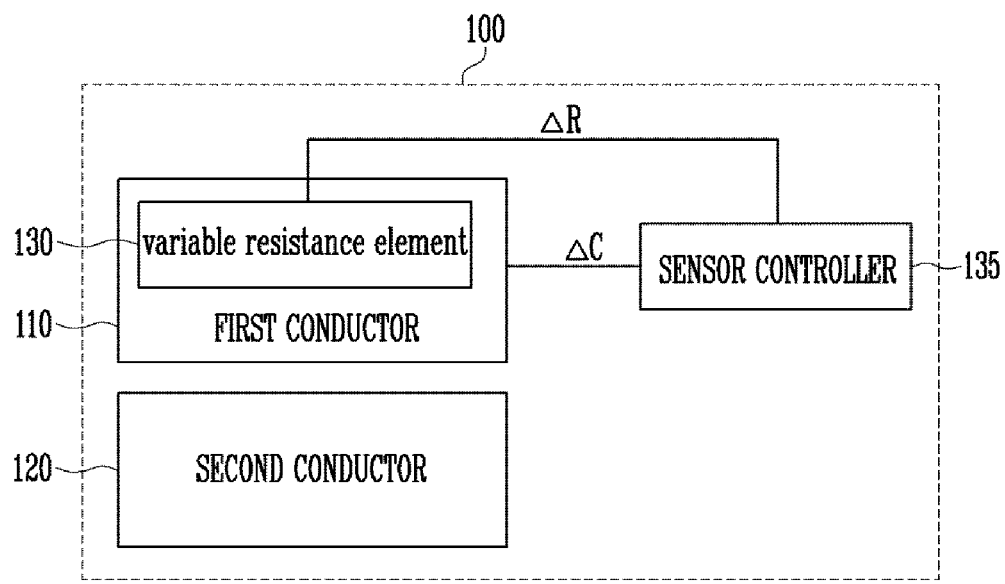
FIG. 3 is a diagram illustrating a sensor including a sensor controller constructed according to the exemplary embodiment of the inventive concepts.

FIG. 3 is a diagram illustrating a sensor including a sensor controller constructed according to the exemplary embodiment of the inventive concepts.

Referring to FIG. 3, the sensor 100 may further include a sensor controller 135.

The sensor controller 135 may detect a pressure applied to the sensor 100 by sensing a variation ΔC of capacitance existing between the first conductor 110 and the second conductor 120 and a variation ΔR of resistance of the variable resistance element 130.

Further, when a plurality of variable resistance elements 130 is included in the sensor 100, the sensor controller 135 may also sense a location, (touch position) through the detection of the pressure.

The sensor controller 135 may be connected with the first conductor 110 and the variable resistance element 130.

The sensor controller 135 may detect the variation ΔC of capacitance by sensing a variation of current flowing to the first conductor 110, and detect the variation ΔC of resistance by sensing a voltage of the variable resistance element 130.

The method of detecting the variations ΔC and ΔR of capacitance and resistance may differ. For example, the sensor controller 135 may also be connected with the second conductor 120, not the first conductor 110, and the connection of the sensor controller 135 with the variable resistance element 130 may be omitted according to a driving method.

Further, the sensor controller 135 may be connected to both the first conductor 110 and the second conductor 120, so that it is possible to detect the variation ΔC of capacitance and the variation ΔR of resistance.

Figure 4:
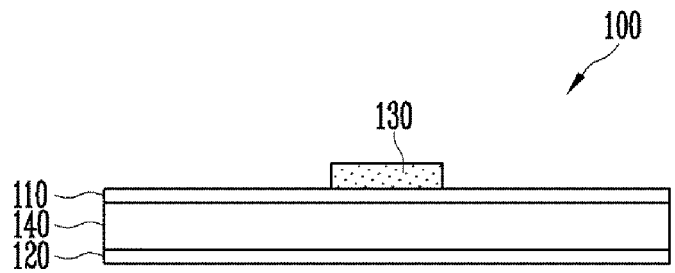
FIGS. 4 and 5 are diagrams illustrating the sensor including a buffer member constructed according to the exemplary embodiment of the inventive concepts.
Figure 5:
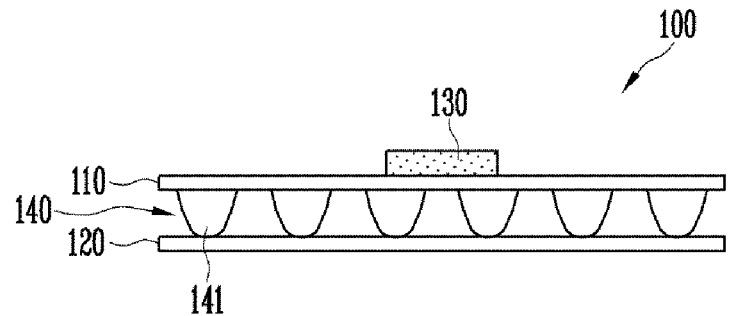

FIGS. 4 and 5 are diagrams illustrating the sensor including a buffer member constructed according to the exemplary embodiment of the inventive concepts.

Referring to FIG. 4, the sensor 100 may further include a buffer member 140.

The buffer member 140 may be positioned between the first conductor 110 and the second conductor 120. Accordingly, the buffer member 140 may be in contact with the first conductor 110 and the second conductor 120.

The buffer member 140 may serve to relieve impact from the outside, and therefore, the buffer member 140 may have elastic force. For example, the buffer member 140 may be deformed by pressure from the outside, and may have elastic force, by which the buffer member 140 is restorable to an original state when the pressure from the outside is removed.

Further, the buffer member 140 may have an insulating property in order to prevent an electric short-circuit between the first conductor 110 and the second conductor 120.

The buffer member 140 may include a porous polymer so as to have elastic force. For example, the buffer member 140 may be provided in a form of a foam body, such as a sponge.

The buffer member 140 may include thermoplastic elastomer, polystyrene, polyolefin, polyurethane thermoplastic elastomers, polyamides, synthetic rubbers, polydimethylsiloxane, polybutadiene, polyisobutylene, [poly(styrene-butadienestyrene)], polyurethanes, polychloroprene, polyethylene, silicone, and a combination thereof, but is not limited thereto.

Referring to FIG. 5, the buffer member 140 may include a plurality of sub-buffer members 141.

The sub-buffer members 141 may be spaced apart from each other, and may have various shapes.

For example, each of the plurality of sub-buffer members 141 may have a shape protruding to one side. That is, as illustrated in FIG. 5, each of the plurality of sub-buffer members 141 may have a shape protruding from the first conductor 110 toward the second conductor 120.

Figure 6:
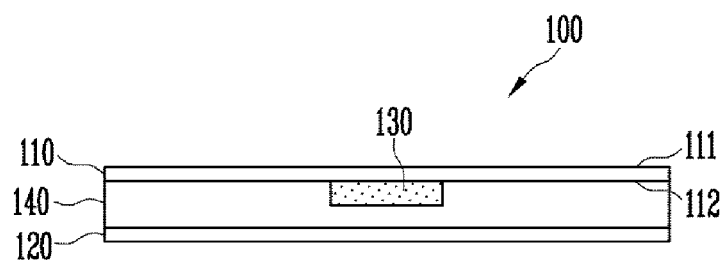
FIG. 6 is a diagram illustrating the sensor constructed according to another exemplary embodiment of the inventive concepts.

FIG. 6 is a diagram illustrating the sensor constructed according to another exemplary embodiment of the inventive concepts.

Referring to FIG. 6, in the sensor 100 according to this exemplary embodiment, the variable resistance element 130 may be positioned on a lower surface 112 of the first conductor 110.

That is, the variable resistance element 130 is not positioned on the upper surface 111 of the first conductor 110 as illustrated in FIG. 1, but the variable resistance element 130 may be positioned on the lower surface 112 of the first conductor 110.

While FIG. 6 illustrates an embodiment where one variable resistance element 130 is connected to the first conductor 110, but embodiments may also be used where plurality of variable resistance elements 130 are connected to the first conductor 110.

Although not separately illustrated, the plurality of variable resistance elements 130 may also be disposed on both the upper surface 111 and the lower surface 112 of the first conductor 110. For example, some of the variable resistance elements 130 may be positioned on the upper surface 111 of the first conductor 110, and the remainder of the variable resistance elements 130 may be positioned on the lower surface 112 of the first conductor 110.

Figure 7A:
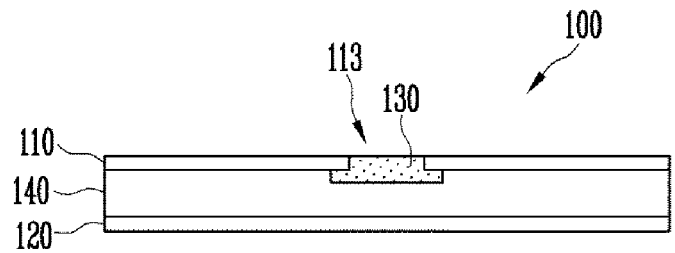
FIGS. 7A and 7B are diagrams illustrating the sensor according to further exemplary embodiments of the inventive concepts.
Figure 7B:
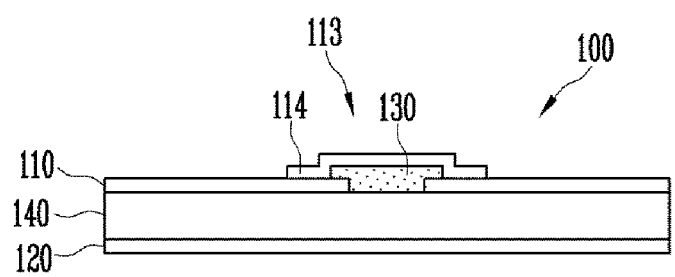

FIGS. 7A and 7B are diagrams illustrating the sensor according to further exemplary embodiments of the inventive concepts.

Referring to FIG. 7A, in the sensor 100, at least a part of the variable resistance element 130 may be positioned on the same layer as that of the first conductor 110.

The first conductor 110 may include an opening region 113, and at least a part of the variable resistance element 130 may be positioned in the opening region 113.

Referring to FIG. 7B, in the sensor 100, a cover part 114 covering the variable resistance element 130 may be provided on the variable resistance element 130. The cover part 114 may include an Optically Clear Resin (OCR) or an Optically Clear Adhesive (OCA). When the cover part 114 is used as the OCA, the cover part 114 may easily adhere to other constituent elements. The cover part 114 may have flexibility and elasticity, and thus, a partial shape of the cover part 114 may be deformed according to a touch and then may be easily restored.

When the cover part 114 includes the OCR or the OCA, it is easy to implement a transparent touch sensor according to the inventive concepts.

FIG. 7B illustrates a case where the cover part 114 is formed only in the region corresponding to the variable resistance element 130, but is not limited thereto. For example, the cover part 114 may also cover most of the sensor 100 or the entire outer surface of the sensor 100.

FIGS. 7A and 7B illustrate an embodiment where one variable resistance element 130 is connected to the first conductor 110, but other embodiments may have a plurality of variable resistance elements 130 connected to the first conductor 110.

FIGS. 8A, 8B, 8C, 8D, 8E, 8F, and 8G are diagrams illustrating the disposition of variable resistance elements on a substrate constructed according to the exemplary embodiment of the inventive concepts. Particularly, FIGS. 8A, 8B, 8C, 8D, 8E, 8F, and 8G illustrate a case where the plurality of variable resistance elements 130 is disposed in the first conductor 110.

The variable resistance elements 130 may be positioned at various positions and/or at a density per unit area according to a size of the sensor or a form of a touch of a user. For example, when there is a region in which a touch is mainly generated and a region in which a touch is not frequently generated, in order to improve touch sensitivity of the region in which the touch is mainly generated, many variable resistance elements 130 may be disposed in the region in which the touch is mainly generated, and a smaller number of variable resistance elements 130 may be disposed in the region in which the touch is not frequently generated. Further, in a region in which a strong touch is generated, considering the fact that it is possible to detect the touch with the small number of variable resistance elements 130, a smaller number of variable resistance elements 130 than the number of variable resistance elements 130 in a region in which a weak touch is generated may be disposed. In addition, when the sensor is applied to another electronic device, such as a display device, the variable resistance elements 130 may be disposed at various positions and/or with a density per unit area depending on the combination with another electronic device. A display device may provide an area which displays an image, and an area which does not display an image, so that the variable resistance elements 130 may be disposed in the area which does not display an image, and a small number of variable resistance elements 130 or no variable resistance element 130 may be disposed in the area which displays an image. Further, the variable resistance elements 130 may be disposed at various positions and/or with various densities with respect to an area which displays an image.

Figure 8A:
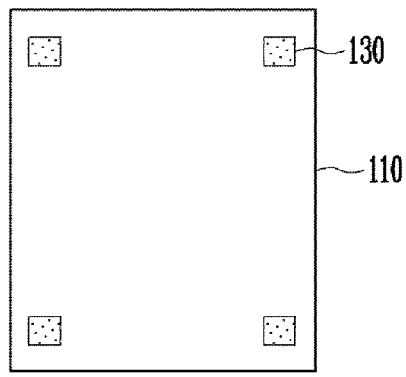
FIGS. 8A, 8B, 8C, 8D, 8E, 8F, and 8G are diagrams illustrating the disposition of variable resistance elements on a substrate constructed according to the exemplary embodiment of the inventive concepts.
Figure 8B:
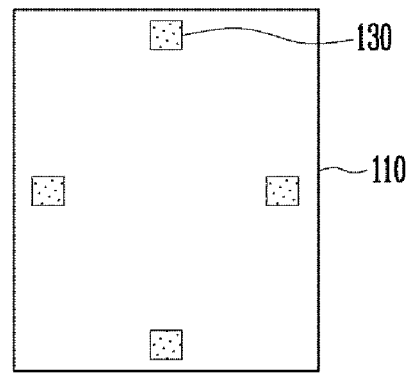

Referring to FIGS. 8A and 8B, the variable resistance elements 130 may be disposed along an edge of the first conductor 110.

Figure 8C:
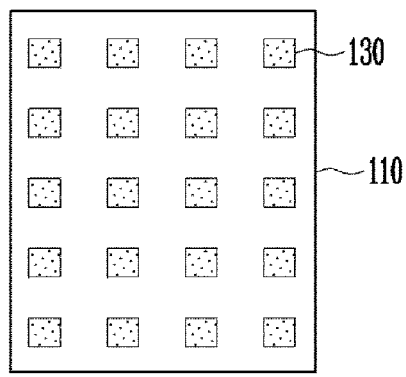

Further, referring to FIG. 8C, the variable resistance elements 130 may be disposed along regular intervals in the first conductor 110. For example, the variable resistance elements 130 may be uniformly disposed so that distances between the variable resistance elements 130 are the same.

Figure 8D:
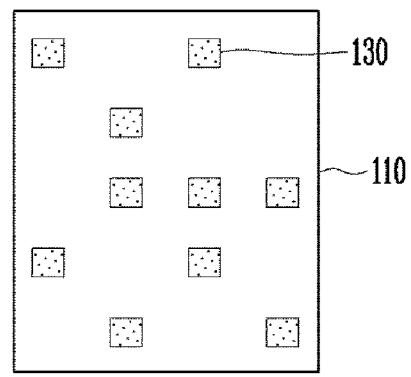

Referring to FIG. 8D, the variable resistance elements 130 may be disposed at irregular intervals. For example, the variable resistance elements 130 may be randomly disposed.

Figure 8E:
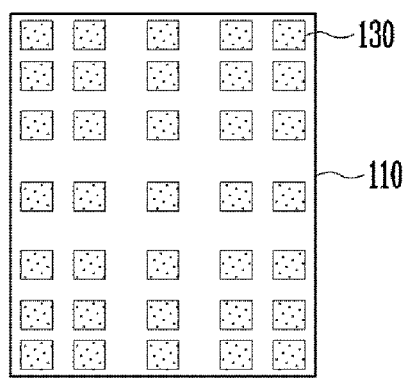

Referring to FIG. 8E, the variable resistance elements 130 may be disposed in the first conductor 110 so as to have a different density according to a position. For example, the variable resistance elements 130 may be densely disposed to be far from a center of the first conductor 110. Alternatively, the variable resistance elements 130 may be densely disposed as becoming close to the center of the first conductor 110.

Figure 8F:
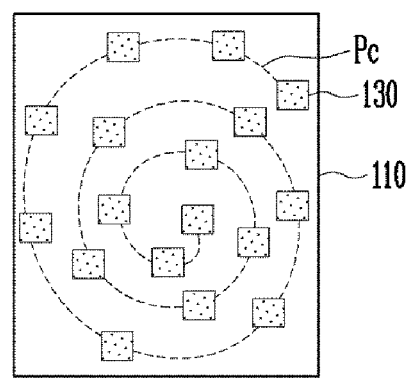

Referring to FIG. 8F, the variable resistance elements 130 may be disposed in the first conductor 110 along a curved path Pc.

FIG. 8F illustrates the curve path Pc as a spiral for an example, but a form of the curve path Pc may be variously changed.

Figure 8G:
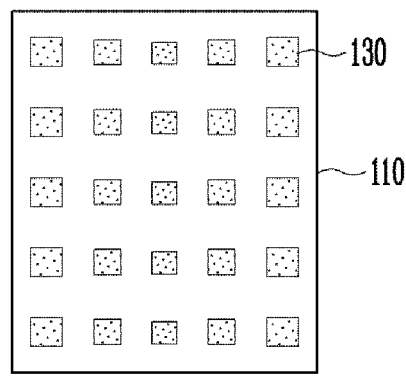

Referring to FIG. 8G, the variable resistance elements 130 may have different sizes according to positions thereof. For example, when the variable resistance elements 130 are far from the center of the first conductor 110, sizes of the variable resistance elements 130 may be increased.

Figure 9:
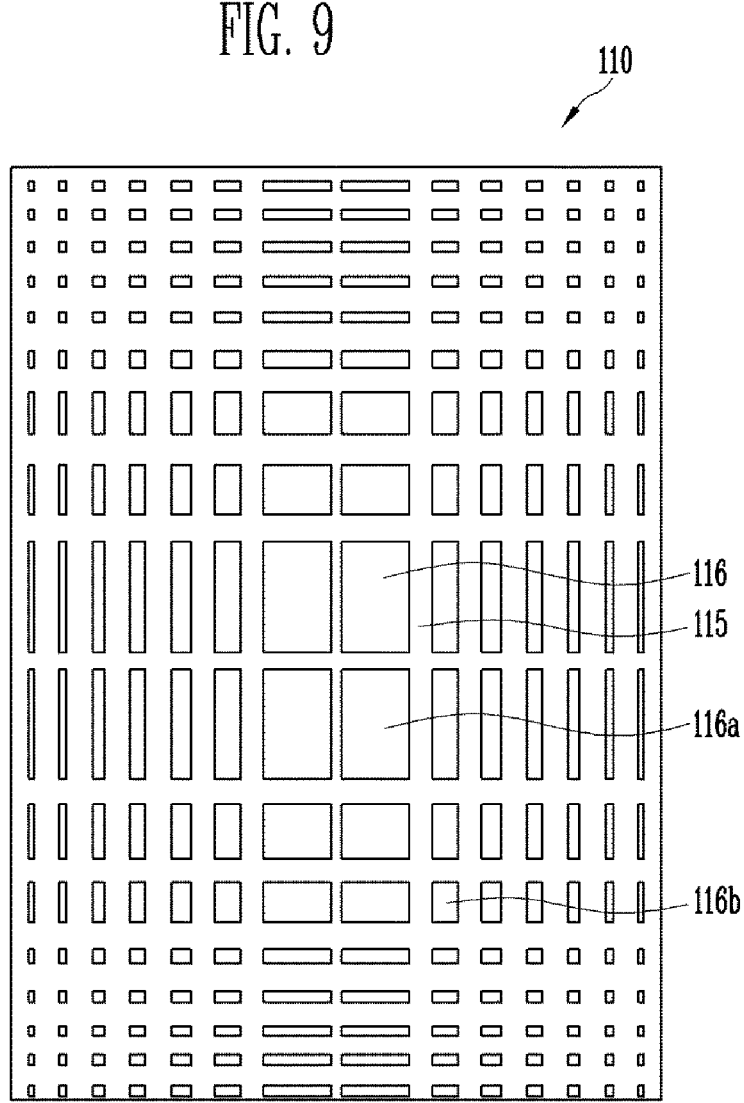
FIG. 9 is a diagram illustrating a first conductor constructed according to the exemplary embodiment of the inventive concepts.

FIG. 9 is a diagram illustrating a first conductor constructed according to the exemplary embodiment of the inventive concepts.

Referring to FIG. 9, the first conductor 110 may have a mesh structure. For example, the first conductor 110 may include a plurality of metal lines 115 forming a plurality of openings 116. In this case, sizes of the openings 116 may be different according to positions of the openings 116.

For example, the openings 116 may include first openings 116a, and second openings 116b positioned farther from the center of the first conductor 110 than the first openings 116a. In this case, a size of the second opening 116b may be set to be smaller than that of the first opening 116a.

Figure 10A:
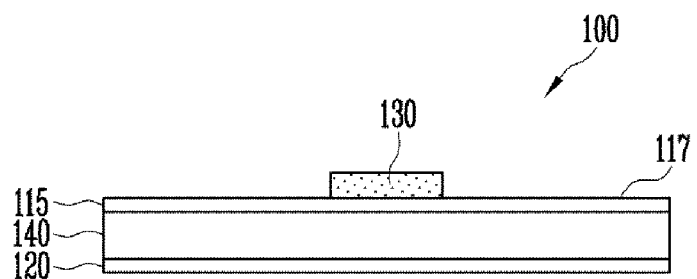
FIGS. 10A, 10B, and 10C are diagrams of the sensor including the first conductor illustrated in FIG. 9.
Figure 10B:
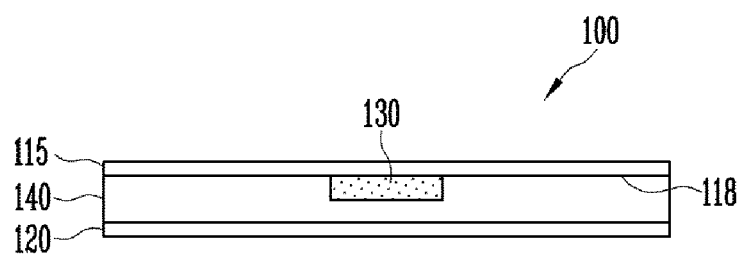
Figure 10C:
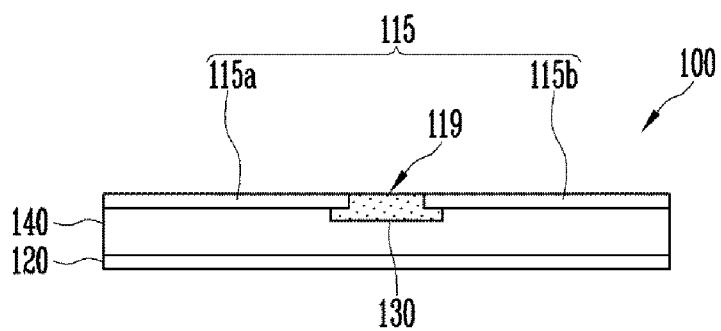

FIGS. 10A, 10B, and 10C are diagrams of the sensor including the first conductor illustrated in FIG. 9.

Referring to FIG. 10A, the variable resistance element 130 may be positioned on an upper surface 117 of the metal line 115 included in the first conductor 110.

Further, referring to FIG. 10B, the variable resistance element 130 may be positioned on a lower surface 118 of the metal line 115 included in the first conductor 110.

When the sensor 100 includes the plurality of variable resistance elements 130, the variable resistance elements 130 may also be disposed on both the upper surface 117 and the lower surface 118 of the metal line 115.

Referring to FIG. 10C, at least a part of the variable resistance element 130 may be positioned on the same layer as that of the metal line 115 included in the first conductor 110.

For example, the metal line 115 may include a first metal line 115a and a second metal line 115b which are spaced apart from each other.

In this case, the variable resistance element 130 may be connected between the first metal line 115a and the second metal line 115b.

That is, a cut region 119 may be present between the first metal line 115a and the second metal line 115b, and the variable resistance element 130 may be positioned in the cut region 119 and may be connected with the first metal line 115a and the second metal line 115b.

FIGS. 10A, 10B, and 10C illustrate embodiments where one variable resistance element 130 is connected to the metal line 115, but embodiments may include a plurality of variable resistance elements 130 connected to the metal line 115.

Although not separately illustrated, the plurality of variable resistance elements 130 may also be disposed on both the upper surface 117 and the lower surface 118 of the metal line 115.

The second conductor 120 and the buffer member 140 of FIGS. 10A-C may be substantially similar as those of the aforementioned exemplary embodiments, so there is no need to repeat their description here is not necessary.

Figure 11A:
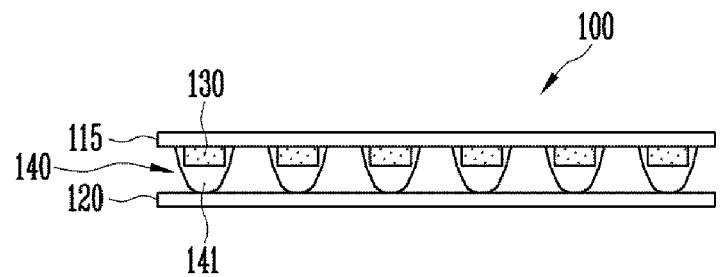
FIGS. 11A and 11B are diagrams illustrating the sensor including sub-buffer members constructed according to the exemplary embodiment of the inventive concepts.
Figure 11B:
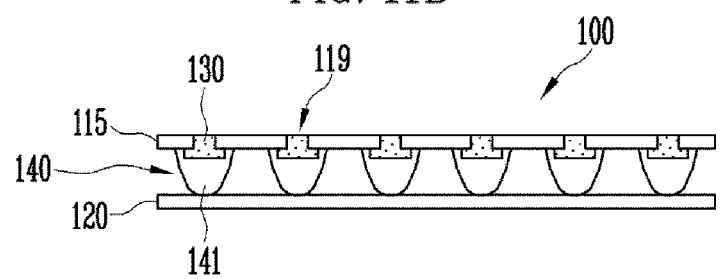

FIGS. 11A and 11B are diagrams illustrating the sensor including sub-buffer members constructed according to the exemplary embodiment of the inventive concepts. Particularly, FIG. 11A illustrates a case where the buffer member 140 includes the plurality of sub-buffer members 141 compared to FIG. 10B, and FIG. 11B illustrates a case where the buffer member 140 includes the plurality of sub-buffer members 141 compared to FIG. 10C.

Referring to FIG. 11A, the plurality of variable resistor elements 130 may be positioned on the lower surface 118 of the metal line 115 included in the first conductor 110.

The buffer member 140 may include a plurality of sub-buffer members 141 separated from each other.

In this case, the plurality of sub-buffer members 141 may be positioned between the variable resistor elements 130 and the second conductor 120. In this case, the plurality of sub-buffer members 141 may be in contact with the variable resistor elements 130 and the second conductor 120.

Further, the sub-buffer members 141 may be provided in forms covering the variable resistance elements 130, respectively, and thus, the variable resistance elements 130 may be included in the sub-buffer members 141, respectively.

Referring to FIG. 11B, the plurality of variable resistor elements 130 may be positioned in the cut regions 119 of the metal line 115 included in the first conductor 110, respectively.

The buffer member 140 may include the plurality of sub-buffer members 141 which are separated from each other, and may be provided in substantially the same form as that of the exemplary embodiment related to FIG. 11A.

Figure 12A:
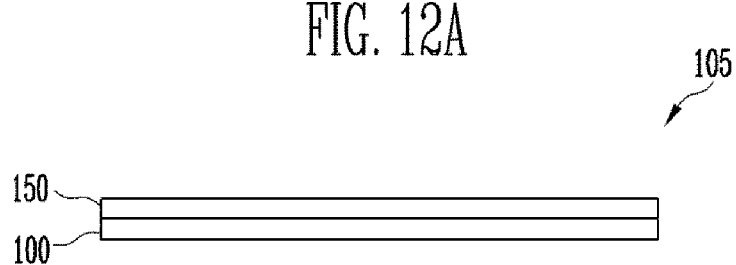
FIG. 12A is a diagram illustrating a touch sensor constructed according to an exemplary embodiment of the inventive concepts.
Figure 12B:
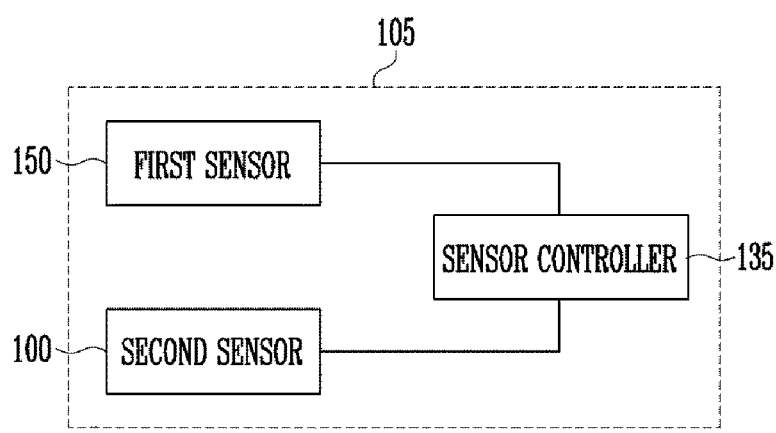
FIG. 12B is a diagram illustrating a touch sensor including a sensor controller constructed according to an exemplary embodiment of the inventive concepts.

FIG. 12A is a diagram illustrating a touch sensor constructed according to an exemplary embodiment of the inventive concepts. FIG. 12B is a diagram illustrating a touch sensor including a sensor controller constructed according to an exemplary embodiment of the inventive concepts.

Referring to FIG. 12A, a touch sensor 105 may include a first sensor 150 and a second sensor 100.

The first sensor 150 may sense a position (location) of a touch input into the touch sensor 105.

For example, the first sensor 150 may be a capacitive sensor, in which capacitance is changed according to a touch input.

Further, the first sensor 150 may be implemented in sensors of various types, such as a resistive type, an infrared beam type, a surface acoustic wave type, an integral strain gauge type, and a piezo type.

The first sensor 150 and the second sensor 100 may be positioned overlapping each other. For example, as illustrated in FIG. 12A, the second sensor 100 may be attached to a lower side of the first sensor 150.

Alternately, the second sensor 100 may be positioned at an upper side of the first sensor 150, and a separate constituent element may be positioned between the first sensor 150 and the second sensor 100.

The second sensor 100 may sense pressure of a touch input into the touch sensor 105.

The second sensor 100 may be implemented in the forms of the sensor 100 described with reference to FIGS. 1 to 11B, and the same element is assigned with the same reference numeral. Accordingly, a detailed description of the second sensor 100 is not necessary.

Referring to FIG. 12B, the sensor 105 may further include a sensor controller 135.

The sensor controller 135 may control operations of the first sensor 150 and the second sensor 100.

For example, the sensor controller 135 may detect a touch position by sensing a change of capacitance generated in the first sensor 150 according to a touch input.

Further, the sensor controller 135 may control the second sensor 100 through the method described with reference to FIG. 3.

The touch sensor 105 may be applied to various electronic devices. For example, the electronic device may include a computer, a Personal Digital Assistant (PDA), a mobile phone, a music player, a navigation device, a digital camera, an Internet terminal, a Global Positioning System (GPS) receiver, a remote controller, and the like.

Figure 13:
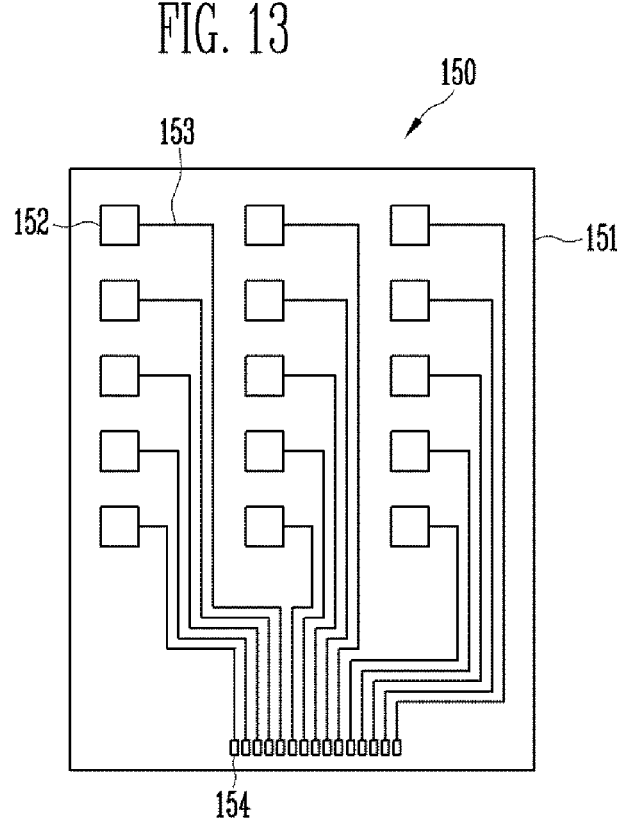
FIG. 13 is a diagram illustrating an exemplary self-capacitive first sensor.

FIG. 13 is a diagram illustrating an exemplary self-capacitive first sensor.

Referring to FIG. 13, the first sensor 150 may be a self-capacitive sensor.

Further, the first sensor 150 may include a plurality of touch electrodes 15 and wires 153.

The touch electrodes 152 may be positioned on a substrate 151, and may include a conductive material. For example, as the conductive material, a metal, an alloy thereof, a conductive polymer, a conductive metal oxide, and the like may be used. The metal may include copper, silver, gold, platinum, palladium, nickel, tin, aluminum, cobalt, rhodium, iridium, iron, ruthenium, osmium, manganese, molybdenum, tungsten, niobium, tantalum, titan, bismuth, antimony, and lead. The conductive polymer may include a polythiophenes compound, a polypyrroles compound, a polyaniline compound, a polyacetylene compound, and a polyphenylenethers compound, and a mixture thereof, and a poly(3,4-ethylenedioxythiophene) polystyrene sulfonate polymer (PEDOT:PSS) compound among the polythiophenes compounds may be used. The conductive metal oxide may include an Indium Tin Oxide (ITO), an Indium Zinc Oxide (IZO), an Antimony Zinc Oxide (AZO), an Indium Tin Zinc Oxide (ITZO), a Zinc Oxide (ZnO), and a Tin Oxide (SnO2). The touch electrodes 152 may be formed of a single layer or multiple layers.

The substrate 151 may be formed of an insulating material, such as glass and resin. Further, the substrate 151 may be formed of a material having flexibility so as to be bent or folded, and may have a single-layer structure of a multi-layer structure.

For example, the substrate 151 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material of the substrate 151 may be variously changed, and may be formed of Fiber Glass Reinforced Plastic (FRP), and the like.

The substrate 151 may be formed of a separate substrate, or various constituent elements included in the display device. For example, the substrate 151 may be an encapsulation substrate or an encapsulation layer used in the display device.

The wires 153 may be connected between the touch electrodes 152 and pads 154. Further, the wires 153 may be connected with the sensor controller 135 through the pads 154.

For example, the pads 154 may be connected with the sensor controller 135 through a separate wire, a flexible printed circuit board, a tape carrier package, a connector, or a chip on film.

When a touch is input into the first sensor 150, self-capacitance of the touch electrodes 152 related to the touch is changed, so that the sensor controller 135 may detect the position (location) where the touch occurred by using signals output from the touch electrodes 152.

Figure 14:
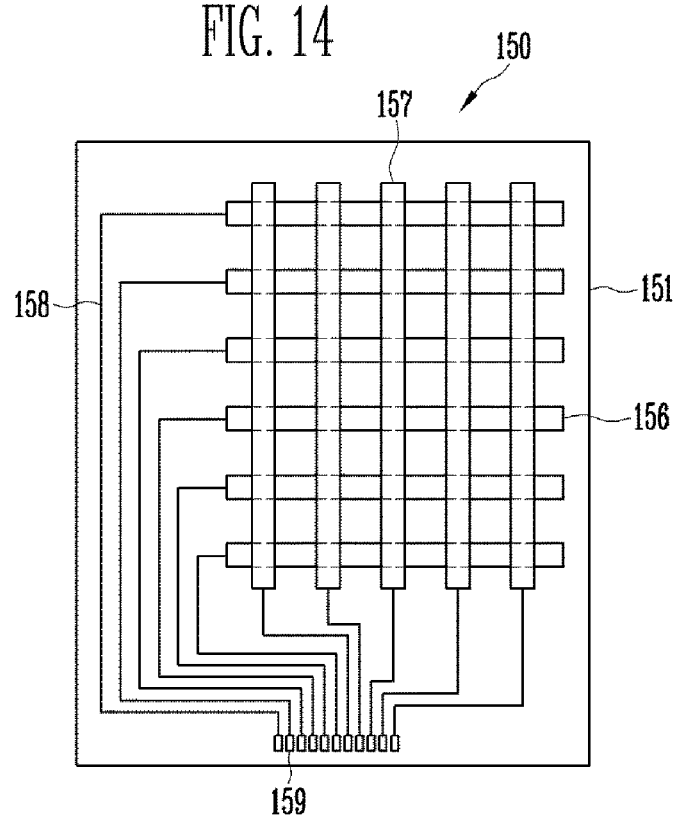
FIG. 14 is a diagram illustrating an exemplary mutual-capacitive first sensor.

FIG. 14 is a diagram illustrating an exemplary mutual-capacitive first sensor.

Referring to FIG. 14, the first sensor 150 may be a mutual-capacitive sensor.

Further, the first sensor 150 may include first touch electrodes 156, second touch electrodes 157, and wires 158.

The plurality of first touch electrodes 156 may be elongated in a first direction and arranged in a second direction crossing the first direction.

The second touch electrodes 157 are spaced apart from the first touch electrodes 156, so that the second touch electrodes 157 may be operated as the mutual capacitive sensors together with the first touch electrodes 156.

To this end, the second touch electrodes 157 may be disposed so as to cross the first touch electrode 156.

For example, the plurality of second touch electrodes 157 may be elongated in the second direction and arranged in the first direction. The first and second directions may be perpendicular to each other.

According to the disposition of the first touch electrodes 156 and the second touch electrodes 157, mutual capacitance between the first touch electrodes 156 and the second touch electrodes 157 is formed, and when a touch is input into the first sensor, mutual capacitance related to the touch changes.

In order to prevent a contact between the first touch electrodes 156 and the second touch electrodes 157, insulating layers (not illustrated) may be formed between the first touch electrodes 156 and the second touch electrodes 157.

The insulating layer may be entirely formed between the first touch electrodes 156 and the second touch electrodes 157, or may be locally formed in crossing regions of the first touch electrodes 156 and the second touch electrodes 157.

The first touch electrodes 156 and the second touch electrodes 157 may be formed of a transparent conductive material, but may be formed of other conductive materials, such as an opaque metal.

For example, the first touch electrodes 156 and the second touch electrodes 157 may be formed of the same material as that of the aforementioned touch electrode 152.

In FIG. 14, it is illustrated that the first touch electrodes 156 and the second touch electrodes 157 have bar shapes, but the shapes of the first touch electrodes 156 and the second touch electrodes 157 may be variously changed.

Further, the first touch electrodes 156 and the second touch electrodes 157 may have mesh structures so as to have flexibility.

The wires 158 may be connected between the touch electrodes 156 and pads 159. Further, the wires 158 may be connected with the sensor controller 135 through the pads 159.

For example, the pads 159 may be connected with the sensor controller 135 through a separate wire, a flexible printed circuit board, a tape carrier package, a connector, or a chip on film.

The first touch electrodes 156 may receive a driving signal from the sensor controller 135, and the second touch electrodes 157 may output a sensing signal reflecting capacitance to the sensor controller 135.

Accordingly, the sensor controller 135 may detect a touch position by using the sensing signals output from the second touch electrodes 157.

Figure 15A:
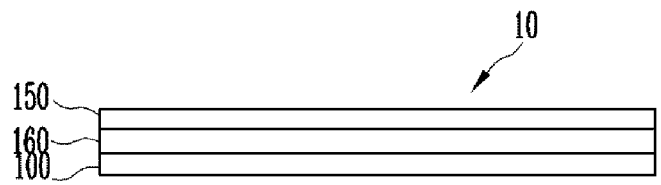
FIG. 15A is a diagram illustrating a display device according to an exemplary embodiment of the inventive concepts.
Figure 15B:
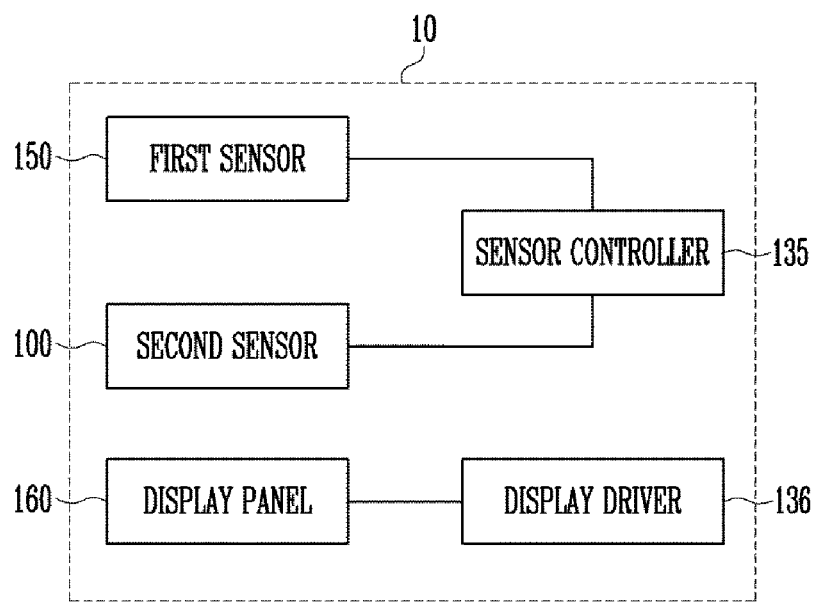
FIG. 15B is a diagram illustrating a display device including a sensor controller and a display driver constructed according to the exemplary embodiment of the inventive concepts.

FIG. 15A is a diagram illustrating a display device according to an exemplary embodiment of the inventive concepts. FIG. 15B is a diagram illustrating a display device including a sensor controller and a display driver constructed according to the exemplary embodiment of the inventive concepts.

Referring to FIG. 15A, a display device 10 may include a first sensor 150, a second sensor 100, and a display panel 160.

The first sensor 150 may sense a position (location) of a touch input into the display device 10. The first sensor 150 may be implemented as the sensor 150 described with reference to FIGS. 12A, 12B, 13, and 14, and the same element is assigned with the same reference numeral. Accordingly, a detailed description of the first sensor 150 is not necessary.

The second sensor 100 may sense a pressure of a touch input into the display device 10. The second sensor 100 may be implemented in the sensor 100 described with reference to FIGS. 1, 2A, 2B, 3, 4, 5, 6, 7A, 7B, 8A, 8B, 8C, 8D, 8E, 8F, 8G, 9, 10A, 10B, 10C, 11A, and 11B, and the same element is assigned with the same reference numeral. Accordingly, a detailed description of the second sensor 100 is not necessary. In this case, the first sensor 150 and the second sensor 100 may be positioned inside or at a surrounding area of the display panel 160.

The display panel 160 may include a plurality of pixels and provide a user with a predetermined image.

Further, the display panel 160 may be positioned overlapping the first sensor 150 and the second sensor 100. For example, the display panel 160 may be positioned between the first sensor 150 and the second sensor 100.

The display panel 160 may display an image on at least one surface. The surface, on which the image is displayed, may be a flat surface having no curvature, or a curved surface having a predetermined curvature. Alternatively, the surface, on which the image is displayed, may be substantially flat, but is bendable or rollable to a non-flat state.

The display panel 160 may display any type of image, and may be an organic light emitting display panel, a liquid crystal panel, an electrophoretic display panel, an electrowetting display panel, a Micro Electro Mechanical system (MEMS) display panel, or other types of displays.

At least a part of the first sensor 150 may overlap the display panel 160 when viewed in a plane. The first sensor 150 may also substantially overlap an entire area of the display panel 160, on which an image is displayed.

At least a part of the second sensor 100 may overlap the display panel 160 The second sensor 100 may also overlap a part of the area, on which an image is displayed, or may overlap a part of the remaining area except for the area, on which an image is displayed.

At least a part of each of the first sensor 150 and the second sensor 100 may be transparent or opaque. Transparency of the first sensor 150 and the second sensor 100 may be differently set according to the disposition positions of the first sensor 150 and the second sensor 100. For example, when the first sensor 150 and/or the second sensor 100 overlap the entire region in which the image is displayed on the display panel 160, at least a part of the first sensor 150 and/or the second sensor 100 may be transparently provided so that the image passes therethrough. When the first sensor 150 and/or the second sensor 100 overlap the region in which the image is not displayed on the display panel 160, the first sensor 150 and/or the second sensor 100 do not need to be essentially transparent and may be opaquely provided. In another exemplary embodiment, when the display panel 160 displays an image through both surfaces, at least a part of the first sensor 150 and/or the second sensor 100 provided in the region in which the image is displayed may be transparently provided.

Referring to FIG. 15B, the display device 10 may further include a sensor controller 135 and a display driver 136.

The sensor controller 135 may control operations of the first sensor 150 and the second sensor 100.

The sensor controller 135 has been already described, so that a description thereof is not necessary.

The display driver 136 may control an image display operation of the display panel 160 by supplying an image driving signal to the display panel 160.

To this end, the display driver 136 may generate an image driving signal by using image data and a control signal provided from the outside.

For example, the display driver 136 may receive image data and a control signal from a host (not illustrated), and the control signal may include a vertical synchronization signal, a horizontal synchronization signal, a main clock signal, and the like.

Further, the image driving signal may include a scan signal, a data signal generated by using image data DATA, and the like.

The sensor controller 135 and the display driver 136 may be combined into one configuration. For example, the sensor controller 135 and the display driver 136 may be implemented in one Integrated Circuit (IC).

The display device 10 may be flexible or rigid. For a flexible display device 10, the constituent elements, such as the display panel 160 or the first sensor 100 and second sensor 150, included in the display device 10, may also individually have flexibility. For example, the display device 10 may have a flexible area having flexibility and/or a rigid area having no flexibility according to a degree of flexibility. When the display device 10 has flexibility, the display device 10 may be foldable, and when it is assumed that a line, along which the display device 10 is folded, is a folding line, the folding line may be provided within the flexible area.

Here, the term "foldable" means that a form is not fixed, but is deformable from an original form to another form, and includes the situation where the display device 10 is foldable or bendable along one or more specific lines, that is, the folding lines, and may be bent in a curve form or rolled in a roll shape. Accordingly, the display device 10 has flexibility within the flexible area, but may not be folded or may be actually folded.

Here, in relation to the flexible area and the rigid area, the terms "having flexibility" or "having no flexibility", and "flexible" or "rigid" are terms relatively representing a property of the display device 10. That is, the expressions "having no flexibility" and "rigid" include a case where the area has flexibility, but has lower flexibility than that of the flexible area, as well as a case where the area has no flexibility and is substantially hard. Accordingly, the rigid area has relatively lower flexibility than that of the flexible area or has no flexibility, and even under a condition, in which the flexible area is folded, the rigid areas may not be folded.

The folding line, the flexible area, or the rigid area may be variously changed. For example, the display device 10 may have both the rigid area and the flexible area, but may have only the flexible area, without the rigid area. Further, a single or multiple folding lines may be provided. Further, in this case, the folding lines may be provided at various positions as necessary, and the whole folding lines may also be rolled in a roll type.

Figure 16:
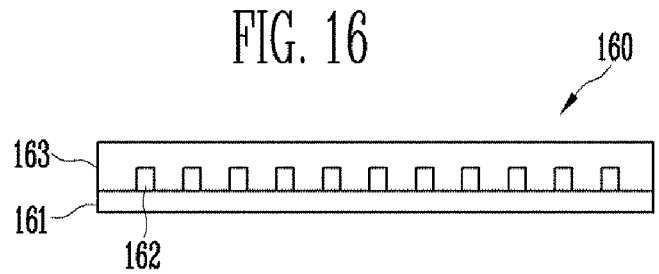
FIG. 16 is a diagram illustrating a display panel constructed according to the exemplary embodiment of the inventive concepts.

FIG. 16 is a diagram illustrating a display panel constructed according to the exemplary embodiment of the inventive concepts.

Referring to FIG. 16, the display panel 160s may include a first substrate 161, pixels 162, and an insulating layer 163.

A plurality of pixels 162 may be positioned on the first substrate 161. Further, the insulating layer 163 may be positioned on the pixels 162 and the first substrate 161.

For example, the substrate 161 may be formed of an insulating material, such as glass and resin. Further, the substrate 161 may be formed of a material having flexibility so as to be bent or folded, and may have a single-layer structure of a multi-layer structure.

The substrate 161 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material of the substrate 161 may be variously changed, and may be formed of Fiber Glass Reinforced Plastic (FRP), and the like.

The pixels 162 may emit light under the control of the display driver 136, and may be protected by the insulating layer 163.

The insulating layer 163 may prevent moisture, oxygen, and the like from permeating to the pixels 162, and may be an encapsulation substrate or an encapsulation layer.

In this case, the insulating layer 163 may include at least one of glass, an organic material, and an inorganic material, and may have a single structure of a multi-layer structure.

The insulating layer 163 may have a multi-layer structure including one or more organic layers and one or more inorganic layers.

A material of the organic material may be a fluoride-based carbon compound, such as polyacryl, polyimide, and Teflon, and an organic insulating material, such as poly epoxy and benzocyclobutene, and a material of the inorganic material may include polysiloxane, a silicon nitride, a silicon oxide, and an inorganic insulating material including an aluminum oxide.

As illustrated in FIG. 15A, when the first sensor 150 is positioned on the display panel 160, the constituent elements (e.g., the touch electrodes 152, 156, and 157) and the wires 153 and 158 included in the first sensor 150 may be directly positioned on the insulating layer 163, so that the first sensor 150 and the display panel 160 may be integrated.

Accordingly, it is possible to remove an unnecessary substrate or layer, thereby decreasing the thickness and manufacturing cost of the display device 10.

Figure 17:
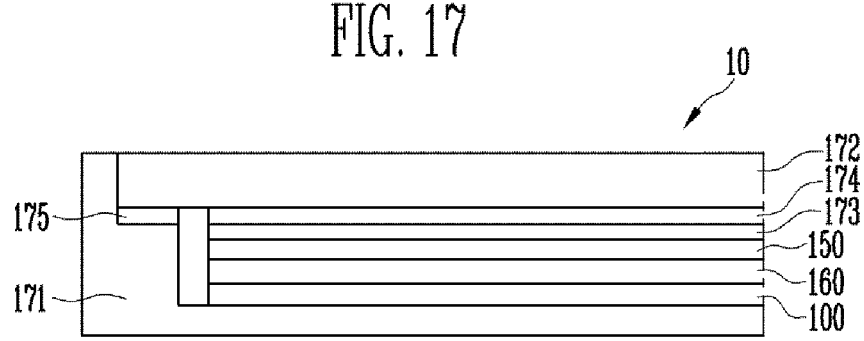
FIG. 17 is a block diagram of a display device constructed according to an embodiment of the inventive concepts.

FIG. 17 is a block diagram of a display device constructed according to an embodiment of the inventive concepts.

Referring to FIG. 17, a display device 10 may include a first sensor 150, a display panel 160, and a bracket 171 accommodating a second sensor 100.

The first sensor 150, the display panel 160, the second sensor 100, and the like may be accommodated inside the bracket 171.

In FIG. 17, the first sensor 150, the display panel 160, the second sensor 100 may be stacked in the same order as that of FIG. 15A, but the stack sequence may be variously changed which will be described below.

Further, the display device 10 may further include a window 172.

In this case, a polarizing plate 173 may be positioned at a lower side of the window 172, and a first attachment member 172 may be positioned between the window 172 and the polarizing plate 173. However, the polarizing plate 173 may be omitted as necessary.

Further, the window 172 may be combined with the bracket 171 through a second attachment member 175.

The first attachment member 172 and the second attachment member 175 may be implemented of an optically transparent adhesive, other resins, a tape, and the like.

Figure 18:
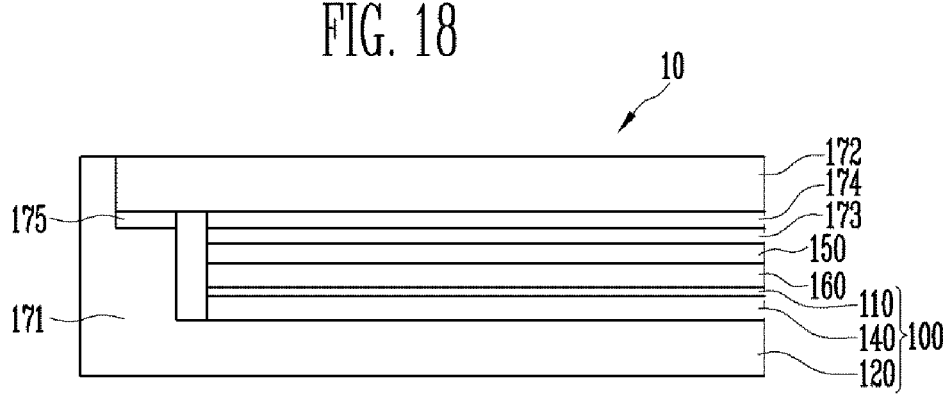
FIG. 18 is a block diagram of a display device constructed according to another embodiment of the inventive concepts.

FIG. 18 is a block diagram of a display device constructed according to another embodiment of the inventive concepts.

Referring to FIG. 18, in a second sensor 100, a part of a bracket 171 may be utilized as a second conductor 120.

To this end, the bracket 171 may include a material having conductivity. Particularly, a part of the bracket 171 positioned at a lower side of a first conductor 110 has conductivity, the corresponding part may be utilized as the second conductor 120.

According to the aforementioned structure, the repeated configurations may be removed, thereby decreasing a thickness and manufacturing cost of the display device 10.

Descriptions of other constituent elements are substantially similar as those of FIG. 17, so that the overlapping descriptions are not necessary.

When the bracket 171 is formed of a conductor, a position of the second sensor 100 may be more variously changed.

For example, the second sensor 100 may be located at a position, which does not overlap the display panel 160. That is, the second sensor 100 may be disposed at an edge area (for example, an area, in which a second attachment member 175 is positioned) of the bracket 171 which does not overlap the display panel 160.

Figure 19:
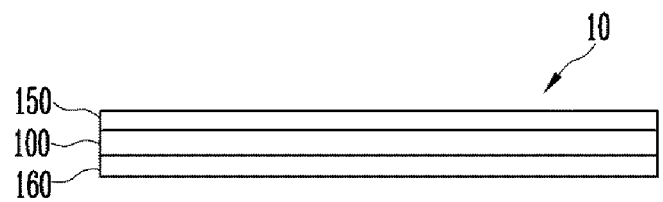
FIGS. 19 and 20 are diagrams illustrating various dispositions of structures of a first sensor, a display panel, and a second sensor.
Figure 20:
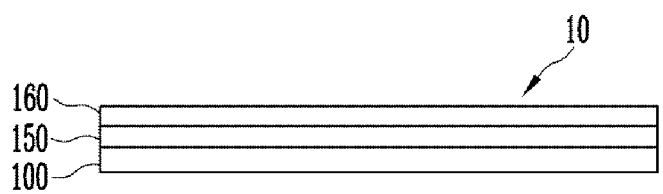

FIGS. 19 and 20 are diagrams illustrating various dispositions of structures of a first sensor, a display panel, and a second sensor.

Referring to FIG. 19, the first sensor 150 and the second sensor 100 may be positioned at an upper side of the display panel 160.

FIG. 19 illustrates a case where the first sensor 150 is positioned at an upper side of the second sensor 100, but the positions of the first sensor 150 and the second sensor 100 may be changed from each other.

When the display panel 160 displays an image in a direction, in which the first sensor 150 and the second sensor 100 are positioned, the first sensor 150 and the second sensor 100 may be transparent so that the image may pass through.

When the display panel 160 displays an image in a direction, in which the first sensor 150 and the second sensor 100 are not positioned, the first sensor 150 and the second sensor 100 may be opaque.

Referring to FIG. 20, the first sensor 150 and the second sensor 100 may be positioned under the display panel 160.

FIG. 20 illustrates a case where the first sensor 150 is positioned at an upper side of the second sensor 100, but the positions of the first sensor 150 and the second sensor 100 may be changed from each other.

Figure 21:
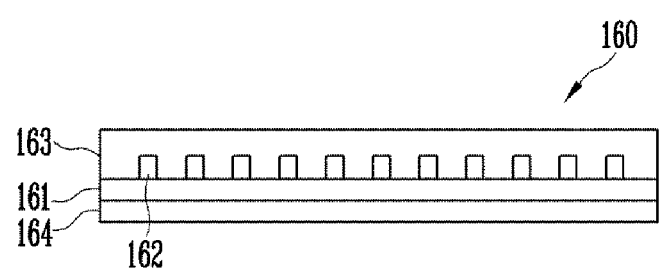
FIG. 21 is a diagram illustrating a display panel according to another exemplary embodiment of the inventive concepts.

FIG. 21 is a diagram illustrating a display panel according to another exemplary embodiment of the inventive concepts.

Referring to FIG. 21, the display panel 160 may include a first substrate 161 and a second substrate 164.

The second substrate 164 may be formed of an insulating material, such as resin. Further, the second substrate 164 may be formed of a material having flexibility so as to be bent or folded, and may have a single-layer structure of a multi-layer structure.

For example, the substrate 164 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material of the second substrate 164 may be variously changed, and may be formed of Fiber Glass Reinforced Plastic (FRP), and the like.

Particularly, the first substrate 161 and the second substrate 164 may be formed of a material having flexibility, such as polyimide.

A plurality of pixels 162 may be positioned on the first substrate 161, and the second substrate 164 may be positioned under the first substrate 161.

Descriptions of other constituent elements are substantially similar to those of FIG. 16, so that the overlapping descriptions are not necessary.

Figure 22:
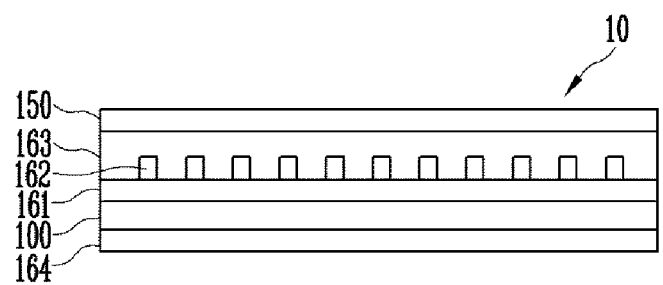
FIG. 22 is a diagram illustrating a second sensor positioned within the display panel illustrated in FIG. 21.

FIG. 22 is a diagram illustrating a second sensor positioned within the display panel illustrated in FIG. 21.

When the display panel 160 includes the plurality of substrates 161 and 164, the second sensor 100 may be positioned between the substrates 161 and 164, and thus may be positioned within the display panel 160.

That is, some of the constituent elements included in the second sensor 100 (e.g., second conductor 120) are directly positioned on the second substrate 164, so that the second sensor 100 and the display panel 160 may be integrated.

Accordingly, it is possible to remove an unnecessary substrate or layer, thereby decreasing the thickness and manufacturing cost of the display device 10.

Figure 23:
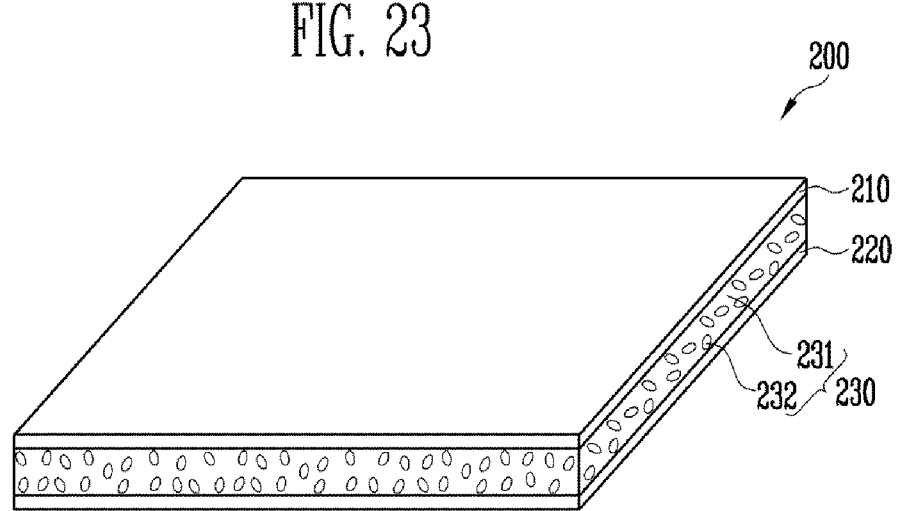
FIG. 23 is a diagram illustrating a sensor constructed according to another exemplary embodiment of the inventive concepts.

FIG. 23 is a diagram illustrating a sensor constructed according to another exemplary embodiment of the inventive concepts.

In the exemplary embodiments below, in order to avoid duplicative descriptions, different parts than those of the aforementioned exemplary embodiment will be mainly described. Further, in the exemplary embodiments below, the same/similar constituent element is assigned with the same/similar reference numeral and is described, and non-described parts generally follow the aforementioned exemplary embodiment.

Referring to FIG. 23, a sensor 200 includes a first conductor 210, a second conductor 220, and a variable resistance element 230 provided between the first conductor 210 and the second conductor 220.

The first conductor 210 may include a conductive material. The conductive material may include a metal or an alloy thereof. The metal may include gold (Au), silver (Ag), aluminum (Al), molybdenum (Mo), chrome (Cr), titanium (Ti), nickel (Ni), neodymium (Nd), copper (Cu), and platinum (Pt). The first conductor 210 may be formed of a transparent conductive material. The transparent conductive material may include a silver nano wire (AgNW), an Indium Tin Oxide (ITO), an Indium Zinc Oxide (IZO), an Antimony Zinc Oxide (AZO), an Indium Tin Zinc Oxide (ITZO), a Zinc Oxide (ZnO), a Tin Oxide ($SnO_2$), a carbon nano tube), and a graphene. The first conductor 210 may be formed of a single layer or multiple layers, for example, multiple layers, in which two or more materials among the materials are stacked.

The first conductor 210 is illustrated in a plate shape in the drawing, but is not limited thereto and may be modified into various shapes. For example, the first conductor 210 may be a shape of connected stripes.

Although not illustrated, an insulating substrate for supporting the first conductor 210 may be further provided. The first conductor 210 may be buried in an upper surface of the substrate. The substrate may have flexibility or may not have flexibility, and may include any one of the materials of the substrate.

The substrate may be transparently or semi-transparently implemented so that predetermined transparency or more is secured, or may also be opaquely implemented according to a disposition structure with respect to the display panel and the like.

The second conductor 220 may be spaced apart from the first conductor 210 and may include a conductive material. The conductive material may be selected from the materials of the first conductor 210, and may be formed of the same material as that of the first conductor 210 or a different material from that of the first conductor 210.

The second conductor 220 may also illustrated in a plate shape in the drawing, but is not limited thereto and may be modified into various shapes. For example, the second conductor 220 may have elongated shapes connected with each other and crossing the first conductor 210.

Although not illustrated, an insulating substrate for supporting the second conductor 220 may be further provided. The second conductor 220 may be located in the upper surface of the substrate. The material of the substrate supporting the second conductor 220 may be selected from the materials of the substrate supporting the first conductor 210, and may be formed of the same material as that of the first conductor 210 or a different material from that of the first conductor 210.

The variable resistance element 230 is provided between the first conductor 210 and the second conductor 220. The variable resistance element 230 is a constituent element, of which an electric characteristic may be changed according to the degree of deformation. The variable resistance element 230 may include a material where the resistance may be changed according to a pressure from the outside between the first conductor 210 and the second conductor 220.

The variable resistance element 230 may include a matrix 231 having elastic force and conductive nano particles 232 provided to the matrix.

One surface of the matrix 231 may be in contact with the first conductor 210, and the other surface facing the one surface may be in contact with the second conductor 220. The matrix 231 may have an insulating property in order to prevent an electric short-circuit between the first conductor 210 and the second conductor 220.

The matrix 231 may be deformed by pressure (for example, pressure by a hand of a user or a stylus) from the outside, and when the pressure from the outside is removed, the matrix 231 has elastic force, by which the matrix 231 may be restored to an original state. The matrix 231 may be provided with a porous polymer so as to have elastic force. The matrix 231 may be provided in a form of a form body, such as sponge.

For example, the matrix 231 may include thermoplastic elastomer, polystyrene, polyolefin, polyurethane thermoplastic elastomers, polyamides, synthetic rubbers, polydimethylsiloxane, polybutadiene, polyisobutylene, [poly(styrene-butadienestyrene)], polyurethanes, polychloroprene, polyethylene, silicone, and a combination thereof, but is not limited thereto.

The nano particles 232 may be provided with a nano tube, a nano column, a nano rod, a nano pore, a nano wire, and the like. The nano particles 232 may include particles of carbon, graphite, a metalloid, a metal, a conductive oxide of the metalloid or the metal, and a conductive nitride of the metalloid or the metal, or include particles in a core shell structure, in which the particles are coated on an insulating bead, or a combination thereof. The semi-metal may include any one of antimony (Sb), germanium (Ge), and arsenic (As), or an alloy thereof. The metal may include a zinc (Zn), aluminum (Al), scandium (Sc), chrome (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy thereof. The conductive oxide may include an indium tin oxide (ITO), an indium zinc oxide (IZO), an aluminum doped zinc oxide (AZO), a gallium indium zinc oxide (GIZO), a zinc oxide (ZnO), and a mixture thereof.

In the exemplary embodiments, the nano particle 232 may be any one of a carbon nano tube and a silver nano wire, but is not limited thereto.

In the exemplary embodiments, the nano particle 232 may be provided by a method of depositing the matrix on the porous surface and the like, but is not limited thereto.

Figure 24A:
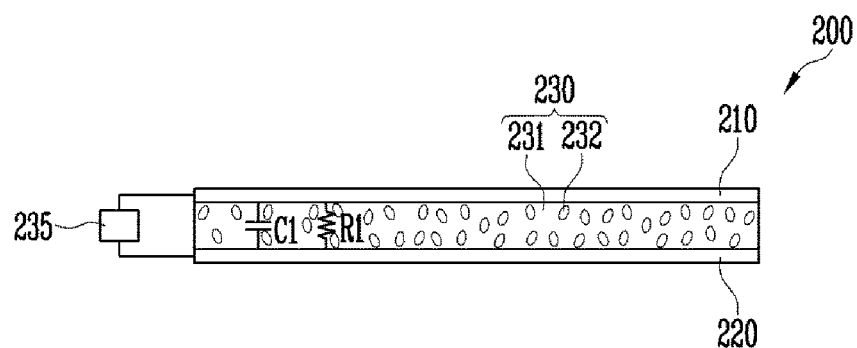
FIGS. 24A and 24B are diagrams illustrating an operation of a sensor constructed according to an exemplary embodiment of the inventive concepts.
Figure 24B:
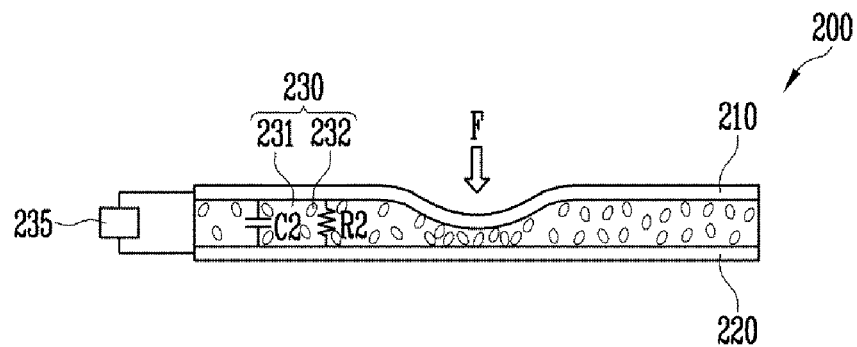

FIGS. 24A and 24B are diagrams illustrating an operation of a sensor constructed according to an exemplary embodiment of the inventive concepts. FIG. 24A illustrates the sensor when pressure is not applied from the outside, and FIG. 24B illustrates the sensor when pressure is applied from the outside.

Referring to FIGS. 24A and 24B, the first conductor 210 and the second conductor 220 may be provided in plate shapes. Although not illustrated, when it is assumed that a plane formed by the first conductor 210 and the second conductor 220 is parallel to an x-y plane, in which an x-axis crosses a y-axis, and a direction vertical to the x-y plane represents a z-axis, a position, at which a touch of the user is generated, is positioned on the x-y plane, and the position may be represented with an x-axis coordinate and a y-axis coordinate. A z-axis coordinate may be changed according to an intensity of a pressure F of the touch, and thus, the intensity of the pressure F of the touch may be represented with the z-axis coordinate or a function related to the z-axis coordinate. Here, the intensity of the pressure F does not simply represent only the intensity of the pressure vertical to the x-y plane, and may also represent an intensity of pressure obliquely applied to the x-y plane. That is, when the pressure F has a vector in the z-axis direction, an intensity of the pressure may be displayed with a value of the z-axis coordinate.

In the sensor 200, the first conductor 210 and the second conductor 220 may be spaced apart from each other by a first distance with the variable resistance element 230 interposed therebetween. When the pressure F is applied to the sensor 200 from the outside by the touch, a distance between the first conductor 210 and the second conductor 220 corresponding to an area, to which the pressure F is applied, may be decreased by the pressure F, and as a result, the first conductor 210 and the second conductor 220 may be spaced apart from each other by a second distance smaller than the first distance.

The pressure F from the outside may change a distance between the nano particles 232. When the distance between the nano particles 232 is changed, an electric characteristic, for example, resistance, of the sensor 200 may be changed. That is, when the distance between the nano particles 232 is changed, the resistance may also be changed. A resistance when the pressure F is not applied from the outside is referred to as first resistance R1, and a resistance when the pressure F is applied from the outside is referred to as second resistance R2. When a variation of the distance is negative, the resistance may decrease so that a variation of the resistance may also be negative. The change in the electric characteristic according to the change in the distance between the nano particles 232 may also be caused by a tunnel effect between the nano particles 232, and may also be caused by an electric conduction effect according to a direct contact between the nano particles 232.

The first conductor 210 and the second conductor 220 may be connected to a sensor controller 235 through a separate wire. The sensor controller 235 may sense an intensity of the pressure F from the outside by sensing a resistance variation ΔR according to the change in the distance between the first conductor 210 and the second conductor 220.

The sensor 200 may sense the change in resistance and the change in capacitance at the same time or in a specific order or sequence. Accordingly, it is possible to easily sense a touch position and a size of pressure when the touch is generated, and the sensitivity of touch sensing for position is also improved. In addition, since the sensor 200 is capable of detecting the change in capacitance and the change in resistance together, it is possible to sense a touch even in a situation where only one of a change in capacitance or a change in resistance is sensed. For example, in a case of hovering, in which there is little or no contact with the sensor, it is possible to sense a touch by sensing the change in capacitance.

The pressure F from the outside may change the distance between the first conductor 210 and the second conductor 220. When the distance between the first conductor 210 and the second conductor 220 is changed, capacitance among the electric characteristics of the sensor may also be changed. That is, when it is assumed that capacitance when the pressure F is not applied from the outside is referred to as first capacitance C1, and capacitance when the pressure F is applied from the outside is referred to as second capacitance C2, capacitance is changed according to the change in distance between the first conductor 210 and the second conductor 220 (e.g., ΔC). For example, when a variation of the distance is negative, the capacitance is also decreased, so that a variation of the capacitance may be negative.

The sensor controller 235 may sense an intensity of the pressure F from the outside by sensing a capacitance variation according to the change in the distance between the first conductor 210 and the second conductor 220.

In the sensing of the change in capacitance the sensor controller 235 may be connected to each of the first conductor 210 and the second conductor 220 and sense a mutual capacitance. The sensor controller 235 may also optionally apply a reference potential to the second conductor 220 and may sense self-capacitance of the first conductor 210.

The sensor may easily obtain information on the intensity of the pressure from the outside by simultaneously or sequentially sensing the change in resistance and the change in capacitance as described above. The sensor 200 may be variously interpreted according to the intensity of the pressure F. For example, the sensor controller 235 of the sensor 200 may control an input of information according to the pressure F by designating a predetermined reference value and comparing the intensity of the pressure F with the predetermined reference value. For example, only when the intensity of the pressure F is equal to or larger than the predetermined reference value, the sensor controller 235 may determine that a touch is generated, and when the intensity of the pressure F is smaller than the predetermined reference value, the sensor controller 235 may determine that a touch is not generated. For another example, the sensor controller 235 may also differently divide the input information according to a size of the pressure F, and when a size of the pressure F exceeds a predetermined reference value, the sensor controller 235 may determine that the input is an input, such as a double click, and when a size of the pressure F is equal to or smaller than the predetermined reference value, the sensor controller 235 may determine that the input is an input, such as a single click.

Figure 25:
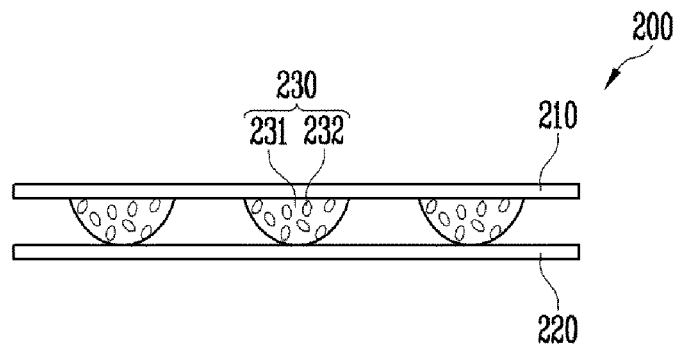
FIG. 25 is a diagram illustrating a sensor according to another exemplary embodiment of the inventive concepts.

The variable resistance element 230 may be provided in various shapes. FIG. 25 is a diagram in which variable resistance elements 230 are differently formed from the illustration of FIG. 23.

FIG. 25 is a diagram illustrating a sensor according to another exemplary embodiment of the inventive concepts.

Referring to FIG. 25, the variable resistance elements 230 may be provided to a part of an area between the first conductor 210 and the second conductor 220. That is, the variable resistance elements 230 may be disposed in a plurality of parts, which are spaced apart from each other when viewed in a plane. The variable resistance element 230 may have various cross-section shapes. In FIG. 25, it is illustrated that a cross-section of the variable resistance element 230 has a semicircular shape, but it is not limited thereto, and may have a shape, such as a polygonal shape including a trapezoid or a rectangle, or a semi-elliptical shape. When the variable resistance elements 230 are not provided, an insulating material, except for the variable resistance elements 230, may be provided between the first conductor 210 and the second conductor 220. Air, an organic/inorganic insulating layer, the aforementioned buffer member, and the like, may be provided between the first conductor 210 and the second conductor 220.

The variable resistance elements 230 may be provided at various positions within the sensor 200. The positions of the variable resistance elements 230 in FIGS. 8A to 8F of the aforementioned exemplary embodiment may be applied in the present exemplary embodiment when viewed in the plane, so that the variable resistance elements 230 in FIGS. 8A, 8B, 8C, 8D, 8E, and 8F may be replaced with the variable resistance elements 230 in the present exemplary embodiment.

The sensors constructed according to the inventive concepts may further include a sensor for sensing a position of a touch, in addition to the sensor sensing an intensity of a pressure from the outside, and may be operated as a touch sensor 205.

Figure 26A:
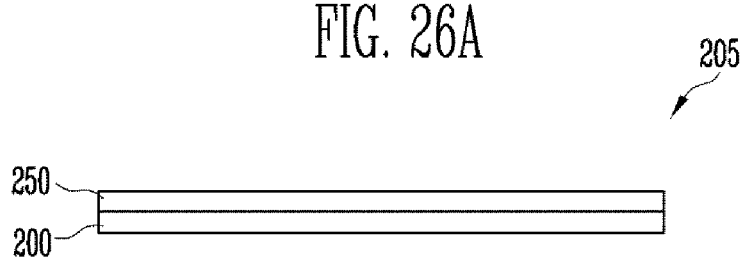
FIG. 26A is a diagram illustrating a touch sensor structure constructed according to an exemplary embodiment of the inventive concepts.
Figure 26B:
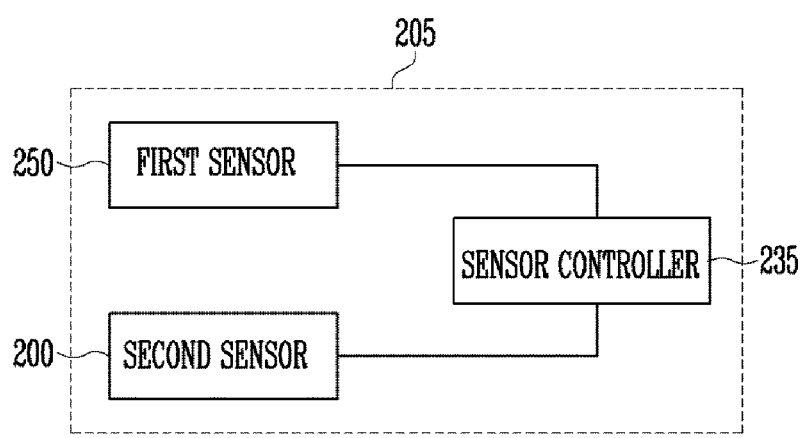
FIG. 26B is a block diagram of the touch sensor of FIG. 26A.

FIG. 26A is a diagram illustrating a touch sensor structure constructed according to an exemplary embodiment of the inventive concepts. FIG. 26B is a block diagram of the touch sensor of FIG. 26A. In FIGS. 26A and 26B, for the convenience of description, it is assumed that a sensor for sensing the position is a first sensor 250 and a sensor sensing an intensity of the pressure is a second sensor 200.

Referring to FIG. 26B, the touch sensor 205 may include the first sensor 250, the second sensor 200, and a sensor controller 235 connected with the first sensor 250 and the second sensor 200.

The first sensor 250 may sense a position, at which a touch of the user is generated, and the second sensor 200 may sense an intensity of applied pressure. Accordingly, the touch sensor 206s may sense, according to the touch of a user, the position (location) at which the touch of the user was generated, and/or an intensity of pressure of the touch applied by the user.

The first sensor 250 may be a sensor sensing a touch position of a user, but is not particularly limited. The first sensor 250 may be implemented in various types, such as a capacitive type, a resistive type, an infrared beam type, a surface acoustic wave type, an integral strain gauge type, and a piezo type.

The first sensor 250 may substantially be the same as the first sensor 250 illustrated in each of FIGS. 13 and 14 of the aforementioned exemplary embodiments.

The second sensor 200 may sense an intensity of pressure of a touch of a user, and may be substantially the same as the second sensor 200 illustrated in each of FIGS. 23 and 25.

The touch sensor according to the exemplary embodiments of the inventive concepts may be applied to various electronic devices, including particularly, various portable electronic devices. For example, the electronic devices may include a computer, a Personal Digital Assistant (PDA), a mobile phone, a music player, a navigation device, a digital camera, an Internet terminal, a Global Positioning System (GPS) receiver, a remote controller, and the like.

The electronic devices may include a user interface, and the user interface may include one or more input devices and an output device outputting predetermined information. The touch sensor may be adopted as one input device in the user interface. The input device may be provided in various forms, such as a keyboard, a dial, a joystick, a switch, and a microphone, in addition to the sensor, and may also be adopted together with the sensor. The output device may include a display panel providing visual information, such as an image and a character.

When the display device among the interfaces of the electronic device is adopted as an input device and an output device, the display device may include a touch sensor inputting touch-related information and a display panel displaying an image.

Figure 27:
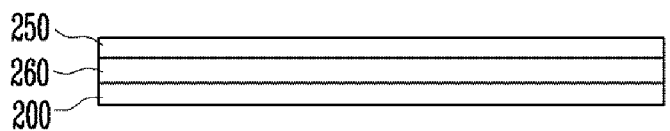
FIG. 27 is a diagram illustrating a display device according to another exemplary embodiment of the inventive concepts.
Figure 28:
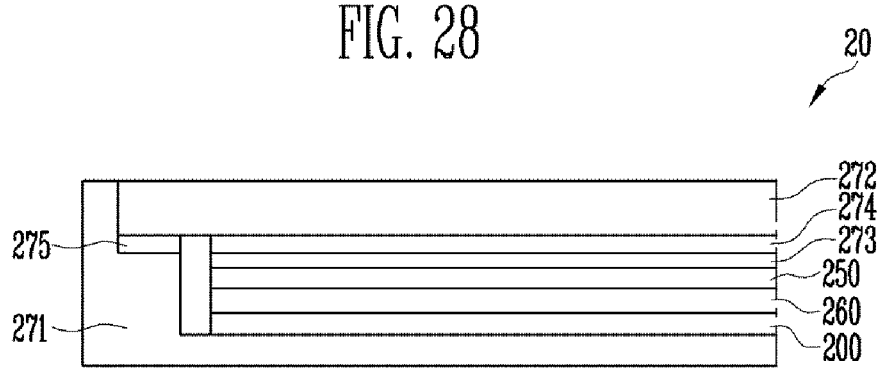
FIGS. 28, 29, 30, 31, and 32 are diagrams illustrating display devices constructed according to exemplary embodiments of the inventive concepts, in which a position of a touch sensor is changed, a constituent element is added, or a part of the constituent elements is replaced.
Figure 29:
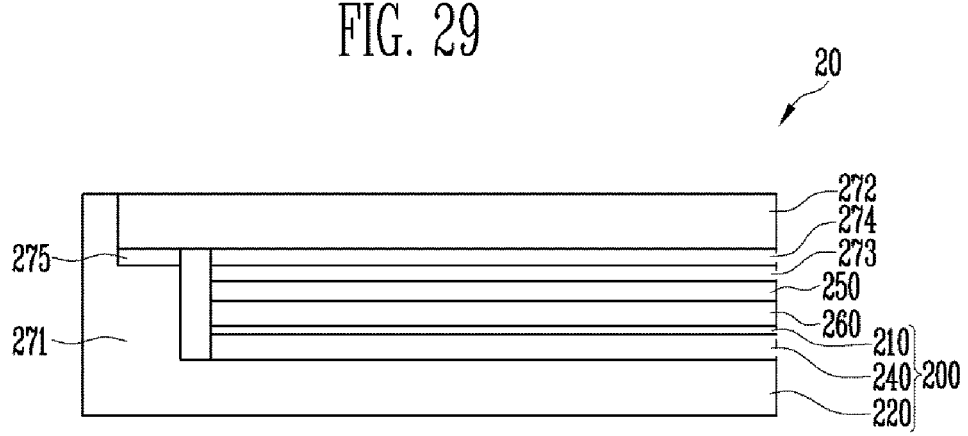

FIG. 27 is a diagram illustrating a display device according to another exemplary embodiment of the inventive concepts.

Referring to FIG. 27, the display device 20 may include a display panel 260 and a touch sensor provided at a surrounding area of the display panel 260.

The display panel 260 may display an image on at least one surface thereof. The surface, on which the image is displayed, may be a flat surface having no curvature, or a curved surface having a predetermined curvature. Alternatively, the surface on which the image is displayed may be substantially flat, but is bendable or rollable into a non-flat configuration.

The display panel 260 may display an image, but is not particularly limited. The display panel 260 may be an organic light emitting display panel, a liquid crystal panel, an electrophoretic display panel, an electrowetting display panel, and an Micro Electro Mechanical system (MEMS) display panel.

The display panel 260 may be substantially the same as the display panel 160 illustrated in FIG. 16.

The display device 20 may include a first sensor 250 sensing a generation position of a touch and a second sensor 200 sensing an intensity of pressure of the touch from the outside. The first sensor 250 and the second sensor 200 may be provided at the surrounding area of the display panel 260.

In the display panel 260, when it is assumed that a surface, on which the image is displayed is a front surface, and a surface opposite to the front surface is a rear surface, one of the first sensor 250 and the second sensor 200 may be provided at one of the front surface and the rear surface, and the other of the first sensor 250 and the second sensor 200 may be provided at the other of the front surface and the rear surface. The first sensor 250 may be provided at the front surface of the display panel 260 and the second sensor 200 may be provided at the rear surface of the display panel 260.

At least a part of the first sensor 250 may overlap the display panel 260 when viewed in a plane. The second sensor 200 may overlap a part of the area, on which an image is displayed, or may overlap a part of the remaining area except for the area, on which an image is displayed. Further, in the display panel, one or more areas on which the image is displayed may be provided. When the plurality of areas on which the image is displayed is provided, the areas on which the image is displayed may be provided from one display panel 260 or from the plurality of display panels 260. The positions of the first sensor 250 and the second sensor 200 may be variously modified according to the area(s), on which the image is displayed.

At least a part of each of the first sensor 250 and the second sensor 200 may be transparent or opaque.

The positions of the first sensor 250 and the second sensor 200 are not limited thereto, and an additional constituent element or a substituted constituent element may be further included.

FIGS. 28, 29, 30, 31, and 32 are diagrams illustrating display devices constructed according to exemplary embodiments of the inventive concepts, in which a position of a touch sensor is changed, a constituent element is added, or a part of the constituent elements is replaced.

Figure 30:
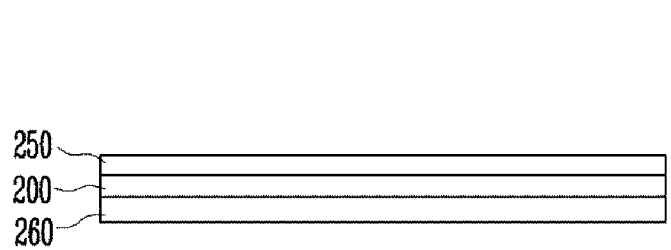
Figure 31:
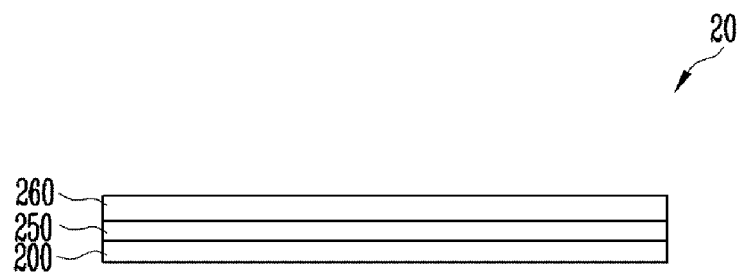
Figure 32:
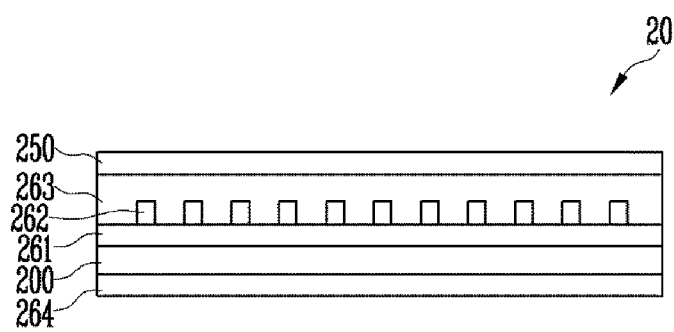

FIGS. 28, 29, 30, 31, and 32 correspond to the exemplary embodiments of FIGS. 17, 18, 19, 20, and 22, respectively, and in each of the non-described constituent element, a similar constituent element is denoted with a similar reference numeral. In FIGS. 30 and 31, the remaining constituent elements, except for the first sensor 250 and the second sensor 200, may substantially be the same as the corresponding constituent elements illustrated in FIGS. 17, 18, 19, 20, and 22. In FIGS. 30 and 31, the first sensor 250 and the second sensor 200 may be replaced with those described in FIG. 26.

Although not illustrated, the touch sensor may also be provided to an additional constituent element, other than the display panel. For example, when a housing on which the display is seated is additionally provided, at least a part of the touch sensor may be provided on the housing. Particularly, the first sensor of the touch sensor may be disposed on a lateral surface or a rear surface of the housing, and may also be disposed on a front surface of the housing.

According to the exemplary embodiments, the touch sensor of the inventive concepts may be provided in various forms unlike the aforementioned exemplary embodiments. Particularly, the variable resistance elements in the touch sensor may be provided at different positions from those of the aforementioned exemplary embodiments.

Figure 33:
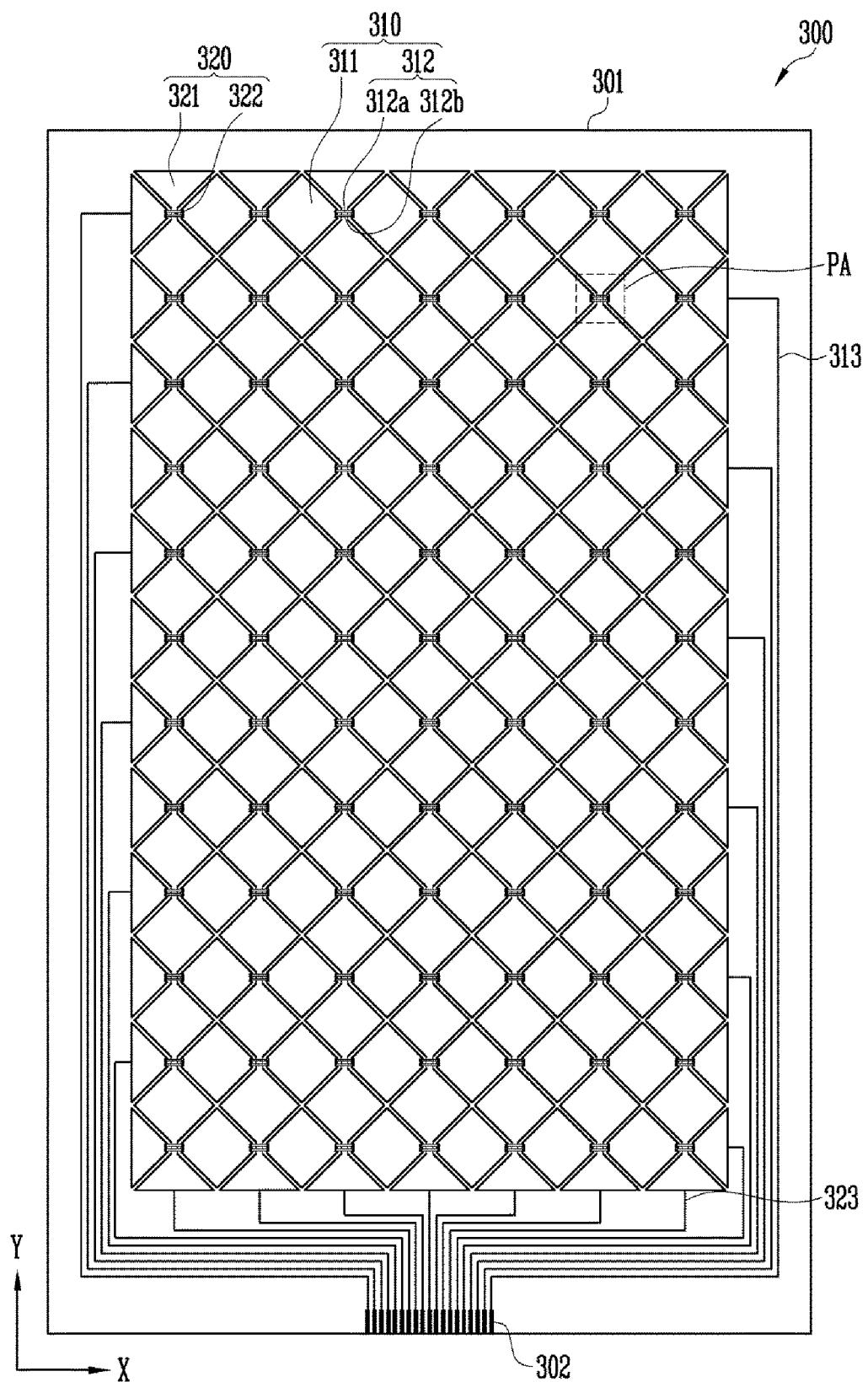
FIG. 33 is a diagram illustrating a touch sensor constructed according to an exemplary embodiment of the inventive concepts.

FIG. 33 is a diagram illustrating a touch sensor constructed according to an exemplary embodiment of the inventive concepts.

Referring to FIG. 33, a touch sensor 300 may include a substrate 301, and first touch electrodes 310 and second touch electrodes 320 formed on the substrate 301. In the touch sensor 300, first wires 313 electrically connected with the first touch electrodes 310 may be provided, and further, second wires 323 electrically connected with the second touch electrodes 320 may be provided. Pads 302 may be connected to ends of the first wires 313 and the second wires 323. In this exemplary embodiment, the pads 302 may be connected a the sensor controller through a separate wire, a flexible printed circuit board, a tape carrier package, a connector, or a chip on film.

The substrate 301 may have flexibility or may not have flexibility. A substrate of the substrate 301 may be selected from the materials configuring the substrate.

Alternatively, the substrate 301 may be transparently or semi-transparently implemented so as to secure a predetermined transparency, or may be opaquely implemented according to a disposition structure with respect to a display panel and the like.

The substrate 301 may be provided as a separate substrate in order to configure the touch sensor 300 separately from the display panel and the like, or may be substituted with at least one substrate among the substrates configuring the display panel or a window in order to provide a touch sensor integrated display device.

The first touch electrodes 310 may be formed in a first direction, for example, an X-direction, on the substrate 301. Each of the first touch electrodes 310 may include a plurality of first sensing cells 311 arranged in the same row in the X-direction and a plurality of first connection parts 312 electrically connecting the first sensing cells 311 arranged in each row in the first direction.

Each of the first connection parts 312 may be configured to include at least two bridges 312a and 312b. For example, the first connection part 312 formed of the first bridge 312a and the second bridge 312b may be formed between the two adjacent first sensing cells 311.

The first touch electrodes 310 may be connected to the pads 302 through the first wires 313, respectively.

The second touch electrodes 320 may be formed in a second direction, for example, a Y-direction, on the substrate 301. Each of the second touch electrodes 320 may include a plurality of second sensing cells 321 arranged in the same column in the Y-direction, and a plurality of second connection parts 322 electrically connecting the second sensing cells 321 arranged in each column in the second direction.

The second connection parts 322 may be integrated with the second sensing cells 321 configuring the second touch electrode 320 in the corresponding column. However, the second connection parts 322 may also be changed to a structure including one or more bridges.

The second touch electrodes 320 may be connected to the pads 302 through the second wires 323, respectively.

FIG. 33 illustrates the first sensing cell 311 and second sensing cell 321, both having a rhomboid shape, but the shapes of the first sensing cell 311 and second sensing cell 321 may be variously changed. For example, the first sensing cell 311 and second sensing cell 321 may be implemented in a circular or rounded shape.

Although not illustrated in FIG. 33, an insulating layer for insulating the first touch electrodes 310 and the second touch electrodes 320 may be interposed in at least one region between the first touch electrodes 310 and the second touch electrodes 320. Particularly, at least at a crossing portion of the first touch electrodes 310 and the second touch electrodes 320.

The first touch electrodes 310 may receive driving signals from the pads 302, respectively, and the second touch electrodes 320 may output detection signals through the pads 302, respectively. In this case, the touch sensor 300 illustrated in FIG. 33 may be driven in a mutual capacitive type.

In FIG. 33, the first touch electrode 310 and second touch electrode 320 are shown disposed in the X-direction and the Y-direction, respectively, but this is not required. For example, the first touch electrodes 310 and/or the second touch electrodes 320 may also be disposed in other directions, for example, an oblique direction, other than the first and second directions.

In the touch sensor 300, at least some of the elements configuring the touch sensor 300 may serve as the aforementioned variable resistance elements.

Accordingly, it is possible to sense a touch pressure from the outside, as well as sense a change in capacitance according to a touch input, and sensibility and utilization of the touch sensor 300 may be improved, which will be described below.

Figure 34:
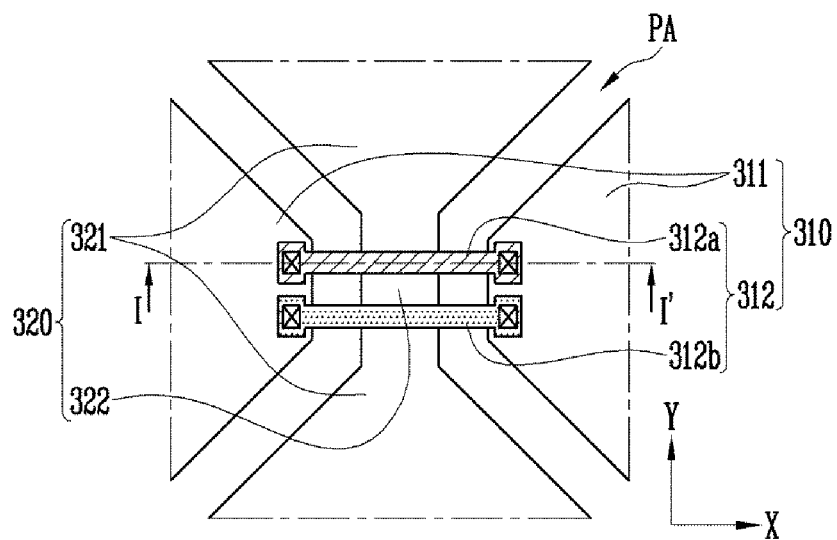
FIG. 34 is a diagram illustrating an enlarged part of the touch sensor illustrated in FIG. 33.

FIG. 34 is a diagram illustrating an enlarged part of the touch sensor illustrated in FIG. 33. In FIG. 34, the same reference numeral is assigned to the constituent elements which are the same as or similar to the constituent elements of FIG. 33, and thus a detailed description thereof is not necessary.

Referring to FIG. 34, a first connection part 312 including first bridge 312a and second bridge 312b may be disposed between two first sensing cells 311 which are adjacent in the first direction. For convenience, the illustrated embodiment shows that the first connection part 312 includes the first bridge 312a and second bridge 312b, but the number of bridges 312a and 312b included in each first connection part 312 may be variously changed. Each first connection part 312 may further include one or more bridges which are not illustrated in FIG. 34.

Further, it is illustrated that the first bridge 312a and second bridge 312b are disposed to be parallel to each other in the first direction, but the disposition directions and the shapes of the first bridge 312a and second bridge 312b may be variously changed. At least one of the first bridge 312a and second bridge 312b may be disposed in an oblique direction or may be formed in a structure having a curve.

Each of the first sensing cell 311 and/or second sensing cell 321 may include a conductive material. As the conductive material, a metal, an alloy thereof, a conductive polymer, a conductive metal oxide, and the like may be used. The metal may include copper (Cu), silver (Ag), gold (Au), platinum (Pt), palladium (Pd), nickel (Ni), tin (Sn), aluminum (Al), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), bismuth (Bi), antimony (Sb), and lead (Pb). The conductive polymer may include a polythiophenes compound, a polypyrroles compound, a polyaniline compound, a polyacetylene compound, and a polyphenylenethers compound, and a mixture thereof, and a PEDOT/PSS compound among the polythiophenes compounds may be used. The conductive metal oxide may include an Indium Tin Oxide (ITO), an Indium Zinc Oxide (IZO), an Antimony Zinc Oxide (AZO), an Indium Tin Zinc Oxide (ITZO), a Zinc Oxide (ZnO), and a Tin Oxide (SnO2). The first sensing cell 311 and second sensing cell 321 may be formed of single layers or multiple layers.

In the illustrated embodiment, at least one first connection part 312 includes the first bridge 312a and the second bridge 312b, which may be formed of different materials.

The first bridge 312a may include the aforementioned material of the first sensing cell 311 and/or second sensing cell 321. The first bridge 312a may be implemented by a metal bridge formed of a low-resistance metal, such as molybdenum (Mo), silver (Ag), titanium (Ti), copper (Cu), aluminum (Al), molybdenum/aluminum/molybdenum (Mo/Al/Mo).

The second bridge 312b may be provided as a variable resistance element. The variable resistance element may be a constituent element, of which an electric characteristic may be changed according to a degree of deformation, and includes a material of which resistance may be changed according to a pressure from the outside. The variable resistance element may include materials referred to as a force sensitive material or a force sensitive resistor. The variable resistance element may include nano particles. The nano particles may be provided with a nano tube, a nano column, a nano rod, a nano pore, a nano wire, and the like. The nano particles may include particles of carbon, graphite, a metalloid, a metal, a conductive oxide of the metalloid or the metal, and a conductive nitride of the metalloid or the metal, or include particles in a core shell structure, in which the particles are coated on an insulating bead or a combination thereof. The semi-metal may include any one of antimony (Sb), germanium (Ge), and arsenic (As), or an alloy thereof. The metal may include a zinc (Zn), aluminum (Al), scandium (Sc), chrome (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy thereof. The conductive oxide may include an indium tin oxide (ITO), an indium zinc oxide (IZO), an aluminum doped zinc oxide (AZO), a gallium indium zinc oxide (GIZO), a zinc oxide (ZnO), and a mixture thereof.

The nano particle may be any one of a carbon nano tube and a silver nano wire, but is not limited thereto.

Any one of the first sensing cell 311 and second sensing cell 321 may be a driving electrode and the other one of the first sensing cell 311 and second sensing cell 321 may be a receiving electrode. When a touch of a user is generated in the first sensing cell 311 and second sensing cell 321 or in surrounding areas of the first sensing cell 311 and second sensing cell 321, a mutual capacitance between the driving electrode and the receiving electrode may be changed. The sensor controller may sense whether a touch of a user is generated and a touch position by sensing the mutual capacitance between the driving electrode and the receiving electrode.

Further, the second bridge 312*b* may be implemented as the variable resistance element, so that when pressure by a touch (or power) from the outside is applied to the second bridge 312*b*, resistance of the second bridge 312*b* may be changed. The change in resistance of the second bridge 312*b* may cause a change in a voltage or a current flowing in the first sensing cells 311. The change in resistance of the second bridge 312*b* may be increased according to an increase in a size of the pressure, and the sensor controller may sense whether the touch of the user is generated and an intensity of the touch by sensing a variation of the voltage or the current.

The second bridge 312*b* may correspond to the variable resistance element, and may be formed of a material having relatively higher resistance than that of the first sensing cells 311. However, the first bridge 312*a*, which has relatively lower resistance than that of the second bridge 312*b*, is provided, so that it is possible to prevent a signal delay and maintain capacitance. Accordingly, it is also possible to easily detect a variation of the capacitance, as well as a variation of the resistance according to the touch input, and also detect a hovering.

At least a part of the second bridges 312*b* included in the first connection parts 312 illustrated in FIG. 33 may be provided as the variable resistance elements.

That is, all of the second bridges 312*b* may be provided as the variable resistance elements, or only some of the second bridges 312*b* may be provided as the variable resistance elements. When all of the second bridges 312*b* are provided as the variable resistance elements, a pressure sensing function may be provided throughout an entire region in which the first connection parts 312 are distributed.

When only some of the second bridges 312*b* are provided as the variable resistance elements, the second bridges 312*b*, except for the bridges provided as the variable resistance elements in the first connection parts 312 illustrated in FIG. 33, may be formed of the same material as that of the first bridges 312*a*.

When at least some of the second bridges 312*b* are provided as the variable resistance elements, the variable resistance elements may be variously disposed. The variable resistance elements may be disposed so as to have various shapes when viewed in a plane as described with reference to FIGS. 8A, 8B, 8C, 8D, 8E, 8F, and 8G, so that the formation positions and the number of variable resistance elements may be variously changed.

When the first bridge 312*a* and second bridge 312*b* are formed of different materials, resistance values of the first bridge 312*a* and the second bridge 312*b* configuring each first connection part 312 may be different according to the areas in which the first bridge 312*a* and the second bridge 312*b* are disposed. The second bridge 312*b* may be provided as the variable resistance element, so that the variable resistance element may adjust a degree of resistance variation according to pressure from the outside. When the variable resistance element is formed of a polymer base material including a conductive nano particle, it is possible to control sensitivity of a change in resistance according to the pressure from the outside by adjusting a concentration of the nano particles. The variable resistance element, of which a resistance variation is large even by a relatively small pressure, may be disposed in a portion in which a touch of a user is frequently generated and which needs to have large sensitivity to the touch. The variable resistance element, of which a resistance variation is small even when a relatively large pressure from the outside is exerted, may be disposed in a portion in which a touch of a user is occasionally generated and which does not need to have a large sensitivity to the touch. In this case, it is possible to improve touch sensitivity through a matching of a resistance ratio (R1/R2) of the first bridge 312*a* and the second bridge 312*b* according to the area.

Particularly, the resistance ratio (R1/R2) may be differently adjusted according to a position within an active area, in which the first touch electrode 310 and second touch electrode 320 are disposed, within each first connection part 312, or the resistance ratio R1/R2 of the first bridge 312*a* and second bridge 312*b* may be equally adjusted for all of the first connection parts 312 regardless of the position.

However, the inventive concepts are not limited to embodiments where the resistance values of the first bridge 312*a* and second bridge 312*b* are differently set. The resistance values of the first bridge 312*a* and second bridge 312*b* may be matched to be similar to each other or to be the same as each other by changing the shapes of the first bridge 312*a* and second bridge 312*b* and the like.

As described above, when the second bridge 312*b* included in at least one first connection part 312 is formed by the variable resistance element, it may be possible to sense a touch position and a touch pressure from the outside when the touch pressure from the outside is transmitted.

Figure 35A:
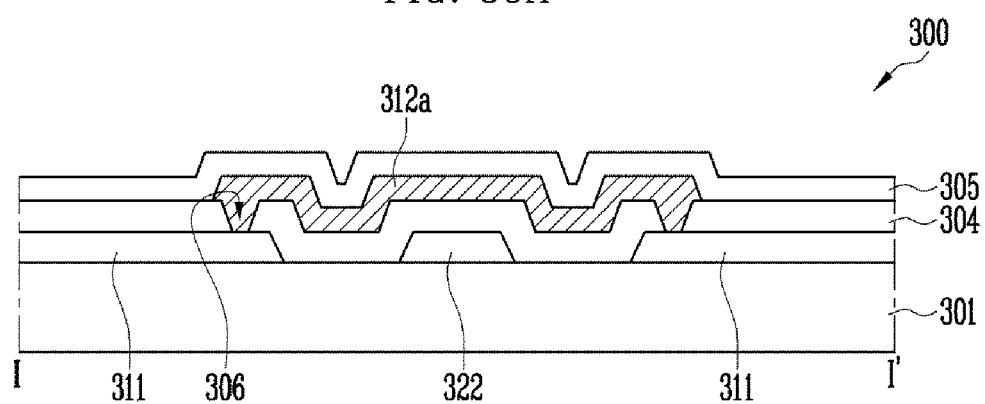
FIG. 35A is an example of a cross-sectional view taken along line I-I' of FIG. 34.
Figure 35B:
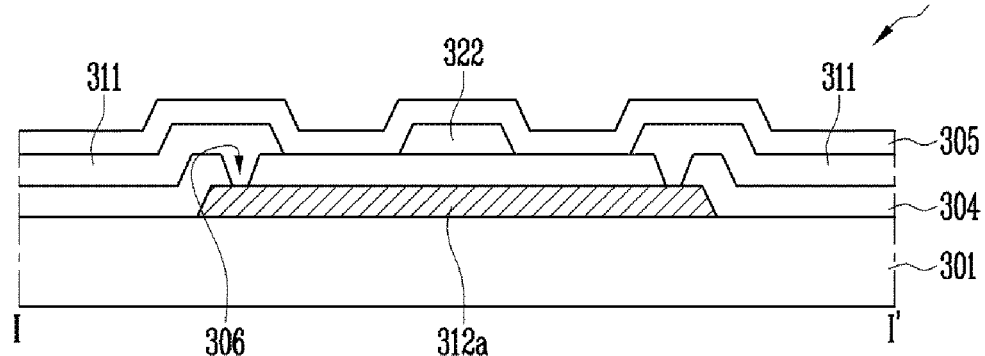
FIG. 35B is another example of a cross-sectional view taken along line I-I' of FIG. 34.

FIG. 35A is an example of a cross-sectional view taken along line I-I' of FIG. 34. FIG. 35B is another example of a cross-sectional view taken along line I-I' of FIG. 34. In FIGS. 35A and 35B, the constituent elements, which are similar to or the same as those of FIGS. 33 and 34, are denoted with the same reference numeral, and a detailed description thereof is not necessary.

Referring to FIG. 35A, the touch sensor 300 may be implemented in an upper bridge structure. More particularly, the touch sensor 300 may include the first sensing cells 311 and a second connection part 322 formed on a first layer on the substrate 301, a first insulating layer 304 formed on the first sensing cells 311 and the second connection part 322, the first bridge 312*a* formed on a second layer on the first insulating layer 304, and a second insulating layer 305 formed on the first bridge 312*a*.

The first bridge 312*a* may be electrically connected to the adjacent first sensing cells 311 through a contact hole 306 passing through the first insulating layer 304.

Although not illustrated in the cross-sectional view of FIG. 35A, the second sensing cells 321 illustrated in FIG. 34 may be integrated with the second connection part 322 and formed on the substrate 301. Further, the second bridge 312*b* may be formed on the first insulating layer 304 together with the first bridge 312*a*.

In FIG. 35A, it is illustrated that the first sensing cells 311 and the second sensing cells 321 are substantially disposed on the same layer, but the inventive concepts are not limited thereto. Depending on an exemplary embodiment, the first sensing cells 311 and the second sensing cells 321 may also be disposed on different layers.

The touch sensor 300 according to the present exemplary embodiment is not limited to the upper bridge structure.

As illustrated in FIG. 35B, the touch sensor may also be implemented in a lower bridge structure.

Referring to FIG. 35B, the first bridge 312a may be formed on the first layer on the substrate 301, and the first sensing cells 311 and the second connection part 322 may be formed on the second layer on the first insulating layer 304.

FIGS. 34 and 35B illustrates an entire-surface insulating layer structure, in which the first insulating layer 304 is entirely formed in the active area, but the inventive concepts are not limited thereto. For example, a partial insulating layer, which is shaped like an island and is locally patterned, may also be formed in every crossing portion of the first connection part 312 and second connection part 322.

Figure 36:
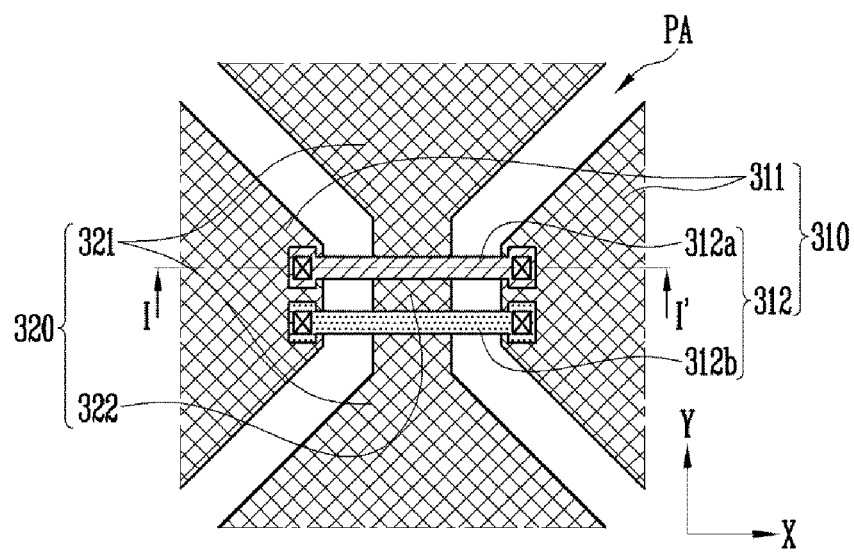
FIG. 36 is a diagram illustrating a modified example of the touch sensor illustrated in FIG. 34.

FIG. 36 is a diagram illustrating a modified example of the touch sensor illustrated in FIG. 34. In FIG. 36, the constituent elements, which are the same as or similar to that of FIG. 34, are denoted with the same reference numeral, and a detailed description thereof is not necessary.

Referring to FIG. 36, the touch sensor may be changed and implemented so that at least one of the first touch electrode 310 and second touch electrode 320 has a mesh-type electrode structure.

For example, at least one of the first sensing cells 311, the second sensing cells 321, and the second connection parts 322 may be formed to include one or more mesh conductive layers.

Figure 37A:
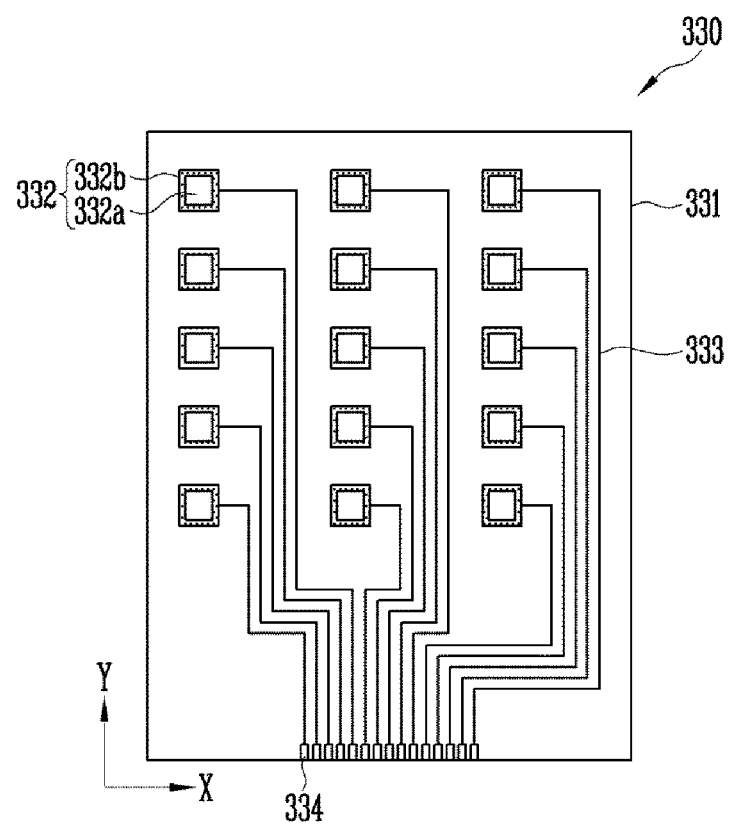
FIGS. 37A and 37B are diagrams illustrating a touch sensor constructed according to another exemplary embodiment of the inventive concepts.
Figure 37B:
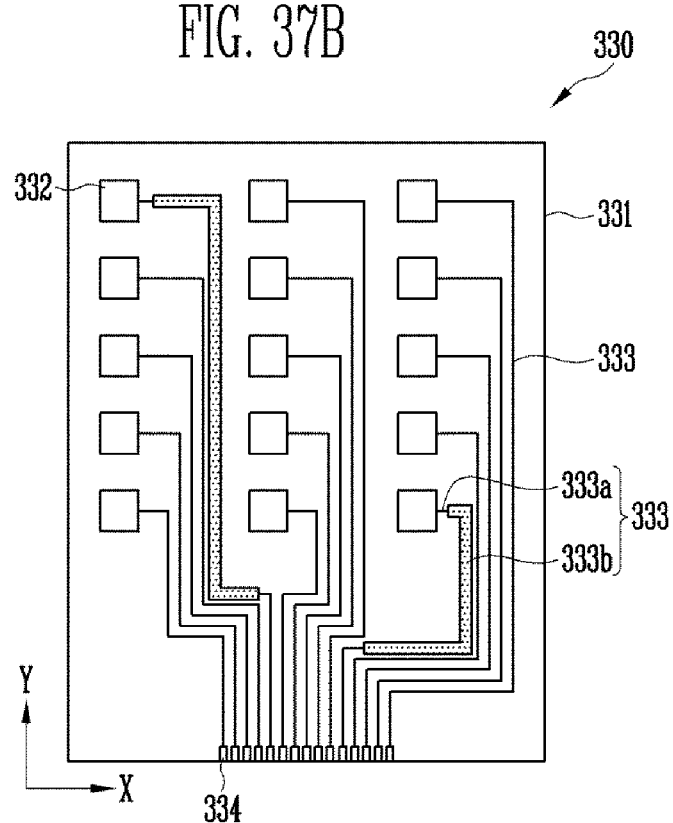

FIGS. 37A and 37B are diagrams illustrating a touch sensor constructed according to another exemplary embodiment of the inventive concepts. In order to disclose various exemplary embodiments, FIGS. 37A and 37B illustrate a self-capacitive touch sensor. However, a distinctive configuration of the exemplary embodiment to be described below is not applicable only to the self-capacitive touch sensor. A distinctive configuration of the exemplary embodiment to be described below is applicable only to the mutual capacitive touch sensor illustrated in FIG. 33.

Referring to FIG. 37A, the touch sensor 330 may include a substrate 331, and a plurality of touch electrodes 332 formed on the substrate 331. A plurality of wires 333 is electrically connected to the touch electrodes 332, and pads 334 may be connected to end portions of the wires 333.

In describing the exemplary embodiment of FIG. 37A, detailed descriptions of the constituent elements described with reference to FIG. 13 are not necessary.

At least some of the touch electrodes 332 may include a variable resistance element material.

Each of the touch electrodes 332 may include an electrode part 332a formed of a conductor and a variable resistance element 332b connected to the electrode part 332a. The variable resistance element 332b may be formed around the electrode part 332a so as to be electrically connected with the electrode part 332a.

Alternatively, only the touch electrodes 332 disposed in the variously settable positions as described with reference to FIGS. 8A, 8B, 8C, 8D, 8E, 8F, and 8G may be implemented to include the electrode part 332a and the variable resistance element 332b, and the remaining touch electrodes 332 may be implemented to include only the electrode part 332a.

When a touch input is provided within the areas in which the touch electrodes 332 including the variable resistance elements 332b are formed, or an area in which a touch pressure from the outside is transmittable, it is possible to detect a change in capacitance and the touch pressure from the outside according to the touch input.

In FIG. 37A, the variable resistance elements 332b may be formed in at least some of the touch electrodes 332. The variable resistance elements 332b may also be applied to other constituent elements of the touch sensor 330.

As illustrated in FIG. 37B, at least some of the wires 333 may be configured to include the variable resistance element material as illustrated in FIG. 37B. At least some of the wires 333 may include a conductive layer 333a formed of a low-resistance metal and the like, and a variable resistance element 333b electrically connected to the conductive layer 333a.

One or more wires 333 including the variable resistance element 333b may include a conductive layer 333a connected between the touch electrode 332 and the pad 334, and the variable resistance element 333b formed on an upper portion and/or a lower portion of the conductive layer 333a.

Alternatively, in the wire 333 including the variable resistance element 333b, at least a predetermined area of the wire 333 may be replaced with the variable resistance element 333b instead of the conductive layer 333a.

The touch electrodes 332 of the exemplary embodiment illustrated in FIG. 37B may be formed of only the conductor, or like the touch electrodes 332 of the exemplary embodiment illustrated in FIG. 37A, the touch electrodes may include an electrode part 332a formed of a conductor and the variable resistance element 332b formed around the electrode part 332a.

Further, the touch electrodes 332 may be changed and implemented so that the some of the touch electrodes 332 includes the electrode part 332a formed of a conductor and the variable resistance element 332b as illustrated in the exemplary embodiment of FIG. 37A, and the remaining touch electrodes 332 may be formed of only a conductor.

That is, according to the exemplary embodiments illustrated in FIGS. 37A and 37B, at least some of the touch electrodes 332 and/or the wires 333 may include the variable resistance elements 332b and 333b.

Additionally, the touch electrodes 332 of the exemplary embodiments illustrated in FIGS. 37A and 37B may be changed to have a mesh.

Figure 38:
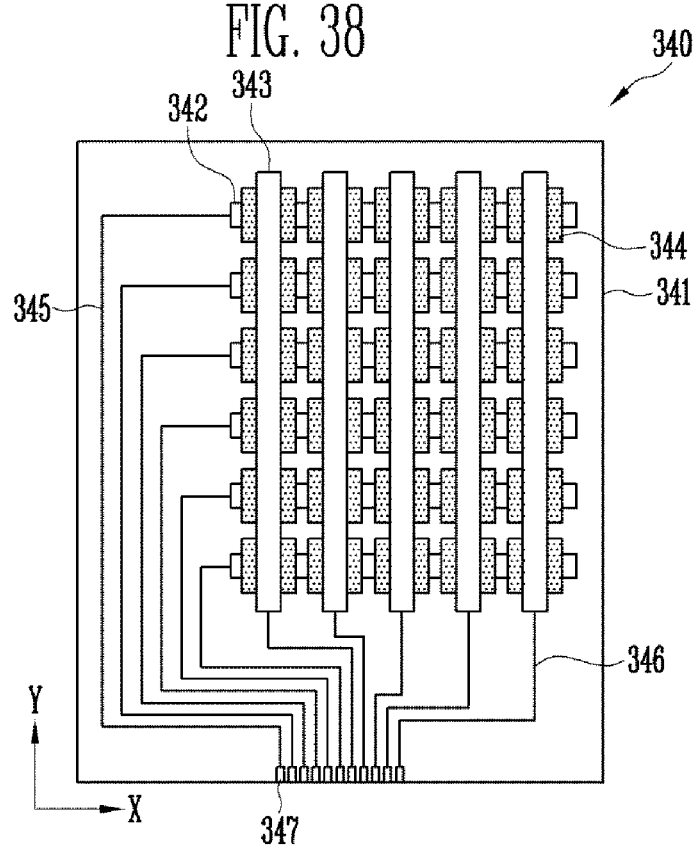
FIG. 38 is a diagram illustrating a touch sensor constructed according to yet another exemplary embodiment of the inventive concepts.

FIG. 38 is a diagram illustrating a touch sensor constructed according to yet another exemplary embodiment of the inventive concepts. In order to disclose various exemplary embodiments, FIG. 38 illustrates a mutual capacitive touch sensor including first touch electrode 342 and second touch electrode 343, both with a rectangular bar shape. However, other shapes may be used. For example, at least some of the first touch electrode 342 and second touch electrode 343 illustrated in FIG. 38 may be changed and implemented to include a plurality of sensing cells and the plurality of connection parts as illustrated in FIG. 33. Further, FIG. 38 illustrates that the first touch electrode 342 and second touch electrode 343 may be disposed under the second touch electrodes, but the inventive concepts are not limited thereto. The first touch electrode 342 may be disposed on the second touch electrode 343, and a location relation between the first touch electrode 342 and second touch electrode 343 may be variously changed and implemented.

Referring to FIG. 38, the touch sensor 340 may include a substrate 341, first touch electrode 342 and second touch electrode 343 formed on the substrate 341 in crossing directions, a partial insulating layer 344 interposed between the first touch electrode 342 and second touch electrode 343 in every crossing part of the first touch electrode 342 and second touch electrode 343 and having an insulating property, first wires electrically connected to the first touch electrodes 342 and second wires 346 electrically connected to the second touch electrodes 343, and pads 347 connected to the first wires 345 and the second wires 346.

In describing the touch sensor 340 illustrated in FIG. 38, detailed descriptions of the constituent elements described with reference to FIG. 14 are not necessary.

Variable resistance elements 344 may be provided between the first touch electrode 342 and second touch electrode 343. The variable resistance element 344 may be replaced with an insulating layer, which insulates the first touch electrode 342 from the second touch electrode 343. The variable resistance element 344 may serve as a dielectric body when a pressure having a predetermined reference value or more is not applied, and resistance of the variable resistance element 344 may be changed when a pressure exceeding the reference value is applied. When the resistance of the variable resistance element 344 is decreased, the first touch electrode 342 and second touch electrode 343, which are disposed in an upper portion and a lower portion with the variable resistance element 344 interposed therebetween, may be conduct electrically.

The variable resistance elements 344 may be distributed in an entire area or a partial area. Additionally, the variable resistance elements 344 may be uniformly or non-uniformly distributed. The variable resistance elements 344 may be variously disposed as described with reference to FIGS. 8A, 8B, 8C, 8D, 8E, 8F, and 8G. A general insulating layer material may also be formed between the first touch electrode 342 and second touch electrode 343, in which the variable resistance elements 344 are not provided.

Accordingly, it is possible to sense an intensity of pressure of the touch by sensing a change in capacitance between the first touch electrode 342 and second touch electrode 343, and sensing whether the first touch electrode 342 and second touch electrode 343 are electrically connected according to a change in resistance of the variable resistance element.

In FIG. 38, at least some of the first touch electrodes 342 and the second touch electrodes 343 may be changed to have a mesh structure.

Figure 39:
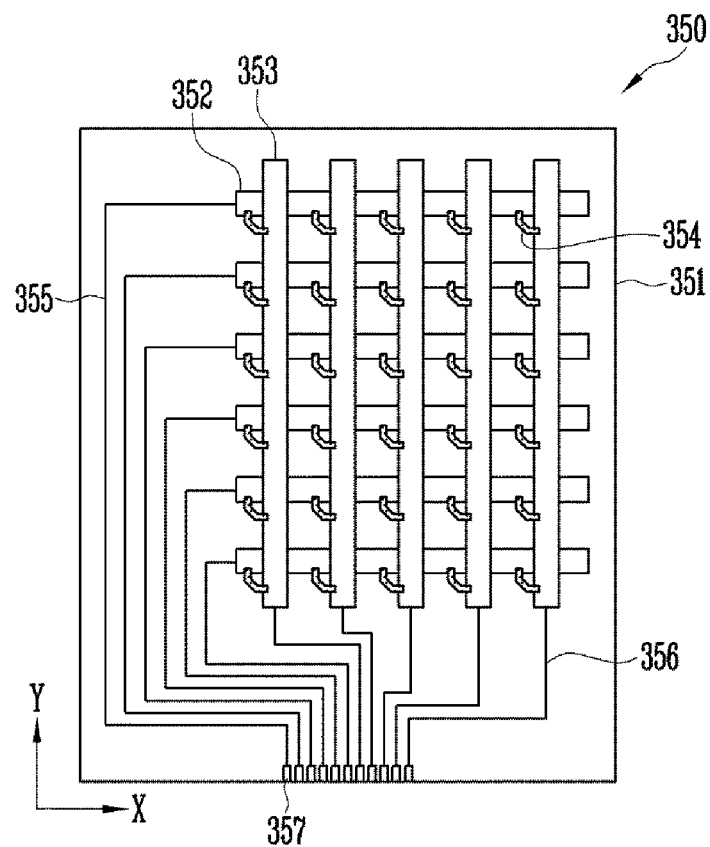
FIG. 39 is a diagram illustrating a touch sensor constructed according to a further exemplary embodiment of the inventive concepts.

FIG. 39 is a diagram illustrating a touch sensor constructed according to a further exemplary embodiment of the inventive concepts. In describing FIG. 39, detailed descriptions of the constituent elements, which are substantially the same as or similar to those of FIG. 38, are not necessary.

Referring to FIG. 39, the touch sensor 350 may include a substrate 351, first touch electrode 352 and second touch electrode 353 formed on the substrate in a crossing direction, first wire 355 electrically connected to the first touch electrode 352 and second wire 356 electrically connected to the second touch electrode 353, and pads 357 connected to the first wire 355 and the second wire 356.

Although not illustrated in FIG. 39, an entire insulating layer or a partial insulating layer may be interposed between the first touch electrode 352 and second touch electrode 353.

In describing the touch sensor 350 illustrated in FIG. 39, detailed descriptions of the constituent elements described with reference to FIG. 38 are not necessary.

Variable resistance elements 354 may be connected between the first touch electrode 352 and second touch electrode 353.

The variable resistance element 354 may be connected between the first touch electrode 352 and second touch electrode 353 in every crossing part of the first touch electrodes 352 and second touch electrodes 353 formed in an active area. In this case, the variable resistance elements 354 may be uniformly distributed, and the entire active area may provide a touch pressure sensing function.

Alternatively, the variable resistance element may be variously disposed between the first touch electrode 352 and second touch electrode 353 as described with reference to FIGS. 8A, 8B, 8C, 8D, 8E, 8F, and 8G. That is, the position at which the variable resistance element 354 is formed may be variously changed so as to be appropriate for various functions, such as sensing a position in an area where a pressure sensing function or sensibility sensing is also desired.

Accordingly, when a touch input is provided within the areas in which the variable resistance elements 354 are formed, or an area within a distance to which a touch pressure from the outside is transmittable to at least one variable resistance element 354, it may be possible to detect a change in capacitance and the touch pressure from the outside according to the touch input.

In FIG. 39, at least one of the first touch electrodes 352 and the second touch electrodes 353 may be changed to have a mesh structure. The first touch electrodes 352 and the second touch electrodes 353 may also be changed to have the structure including the plurality of sensing cells 311 and 321 and the connection parts 312 and 322 as illustrated in FIG. 33.

With reference to FIGS. 33, 34, 35A, 35B, 36, 37A, 37B, 38, and 39, the touch sensors 300, 330, 340, and 350 may be implemented so that at least some of the constituent elements in at least some areas include the variable resistance elements. Further, the distinctive configurations disclosed in FIGS. 33, 34, 35A, 35B, 36, 37A, 37B, 38, and 39 may also be applied.

Accordingly, it is possible to provide the touch sensors 300, 330, 340, and 350 which are capable of sensing a change in capacitance and a touch pressure from the outside according to a touch input.

The touch sensors 300, 330, 340, and 350 illustrated in FIGS. 33, 34, 35A, 35B, 36, 37A, 37B, 38, and 39 may be integrally manufactured with a display panel and the like.

A particular exemplary embodiment related to this will be described in more detail with reference to FIGS. 40 and 41.

Figure 40:
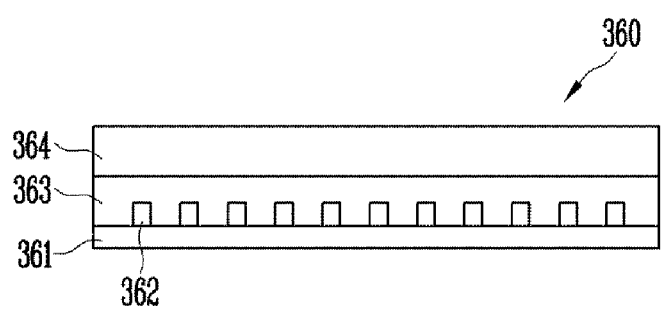
FIG. 40 is a diagram illustrating a touch sensor integrated display panel according to an exemplary embodiment of the inventive concepts.

FIG. 40 is a diagram illustrating a touch sensor integrated display panel according to an exemplary embodiment of the inventive concepts.

Referring to FIG. 40, a touch sensor integrated display panel 360 may include a first substrate 361, a plurality of pixels 362 formed on the first substrate 361, an insulator 363 formed on the first substrate 361 on which the pixels 362 are formed, and a touch sensor 364 formed on the insulator 363.

The touch sensor 364 may have a structure similar to the structures described with reference to FIGS. 33, 34, 35A, 35B, 36, 37A, 37B, 38, and 39, but the substrates 301, 331, 341, and 351 illustrated in FIGS. 33, 34, 35A, 35B, 36, 37A, 37B, 38, and 39 may be omitted. The touch sensor 364 may be directly formed on the upper insulator 363 of the display panel 360.

The insulator 363 may be implemented with an encapsulation thin film TFE. The encapsulation layer TFE may include one or more insulating layers, and may have a multi-layer structure in which one or more organic and inorganic insulating layers are stacked.

Further, the insulator 363 may be implemented with various insulating layers including a passivation layer.

Figure 41:
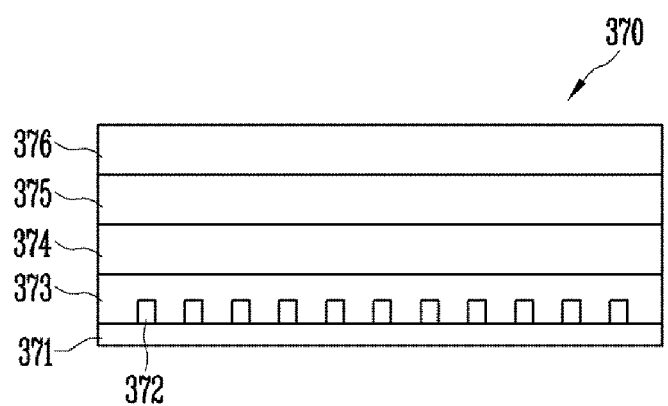
FIG. 41 is a diagram illustrating a touch sensor and integrated display constructed panel according to an exemplary embodiment of the inventive concepts.

FIG. 41 is a diagram illustrating a touch sensor and integrated display constructed panel according to an exemplary embodiment of the inventive concepts.

Referring to FIG. 41, a touch sensor integrated display panel 370 may include a first substrate 371, a plurality of pixels 372 formed on the first substrate 371, a first insulator 373 formed on the first substrate 371, on which the pixels 372 are formed, a first touch sensor 374 formed on the first insulator 373, a second insulator 375 formed on the first touch sensor 374, and a second touch sensor 376 formed on the second insulator 375.

At least one of the first touch sensor 374 and second touch sensor 376 may be formed in a structure, in which one or more exemplary embodiments among the exemplary embodiments described with reference to FIGS. 33, 34, 35A, 35B, 36, 37A, 37B, 38, and 39 are applied. Alternatively, the first and second touch electrodes 310, 320, 342, 343, 352, and 353 included in the exemplary embodiments described with reference to FIGS. 33, 34, 35A, 35B, 36, 37A, 37B, 38, and 39 may be divided and configured as the first touch sensor 374 and the second touch sensor 376. However, the substrates 301, 331, 341, and 351 illustrated in FIGS. 33, 34, 35A, 35B, 36, 37A, 37B, 38, and 39 may be replaced with one or more insulators, for example, the first insulator 373 and/or the second insulator 375 provided in the display panel 370.

The first insulator 373 and second insulator 375, and the first touch sensor 374 and second touch sensor 376, may be alternately disposed on the pixels 362. However, the inventive concepts are not limited thereto. Only one of the first touch sensor 374 and second touch sensor 376 may be provided and inserted between the first insulator 373 and second insulator 375.

At least one of the first insulator 373 and second insulator 375 may be implemented with an encapsulation thin film TFE. Alternatively, when the encapsulation thin film TFE is formed in a multi-layer structure including the first insulator 373 and second insulator 375, the encapsulation thin film TFE may be implemented in a structure in which one or more touch sensors, such as the first touch sensor 374 or the second touch sensor 376, is inserted between the first insulator 373 and second insulator 375.

Figure 42:
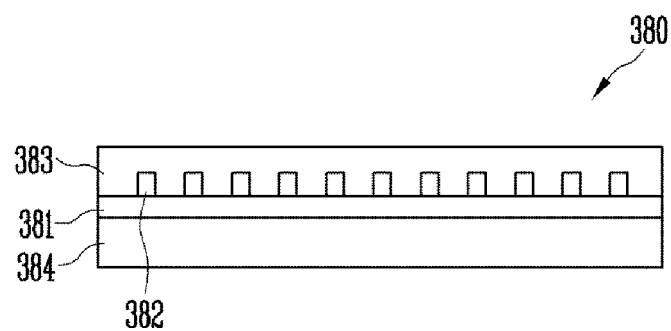
FIG. 42 is a diagram illustrating a touch sensor and integrated display panel constructed according to an exemplary embodiment of the inventive concepts.

FIG. 42 is a diagram illustrating a touch sensor and integrated display panel constructed according to an exemplary embodiment of the inventive concepts.

Referring to FIG. 42, a touch sensor integrated display panel 380 may include a first substrate 381, a plurality of pixels 382 formed on one surface (e.g., an upper surface) of the first substrate 381, an insulator 383 formed on the first substrate 381 on which the pixels 382 are formed, and a touch sensor 384 formed on another surface (e.g., a lower surface) of the first substrate 381.

In FIG. 42, detailed descriptions of the constituent elements overlapping those of FIG. 40 are not necessary.

The touch sensor 384 may have a structure, to which one or more exemplary embodiments among the exemplary embodiments described with reference to FIGS. 33, 34, 35A, 35B, 36, 37A, 37B, 38, and 39 are applied, but the substrates 301, 331, 341, and 351 illustrated in FIGS. 33, 34, 35A, 35B, 36, 37A, 37B, 38, and 39 may be omitted. The touch sensor 384 may be directly formed on a lower substrate of the display panel 380, that is, a rear surface of the first substrate 381.

The first substrate 381 may be implemented of a rigid substrate, such as a glass substrate, or a flexible substrate, such as a polyimide thin film.

Figure 43:
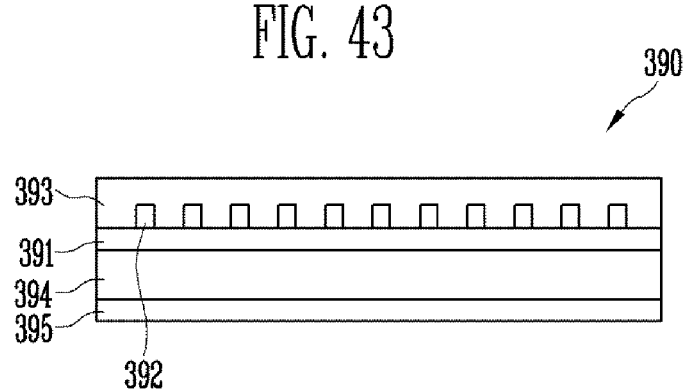
FIG. 43 is a diagram illustrating a touch sensor and integrated display panel constructed according to an exemplary embodiment of the inventive concepts.

FIG. 43 is a diagram illustrating a touch sensor and integrated display panel constructed according to an exemplary embodiment of the inventive concepts.

Referring to FIG. 43, a touch sensor integrated display panel 390 may include a first substrate 391, a plurality of pixels 392 formed on one surface (e.g., an upper surface) of the first substrate 391, an insulator 393 formed on the first substrate 391, on which the pixels 392 are formed, and a touch sensor 394 formed on another surface (e.g., a lower surface) of the first substrate 394, and further includes a second substrate 395 disposed on a lower surface of the touch sensor 394.

In describing FIG. 43, detailed descriptions of the constituent elements described with reference to FIG. 42 are not necessary.

A lower substrate, which may be a base substrate of the touch sensor integrated display panel 390, is formed in a multi-layer structure including the first substrate 391 and the second substrate 395.

Dual polyimide substrates may be applied to the touch sensor integrated display panel 390.

The touch sensor 394 may be inserted into the first substrate 391 and the second substrate 395.

According to the description with reference to FIGS. 40, 41, 42, and 43, it is possible to manufacture the touch sensor integrated display panels 360, 370, 380, and 390 by directly forming one or more touch sensors 364, 374, 376, 384, and 394 on one or more insulators 363, 373, 375, 383, and 393 or substrates 361, 371, 381, 391, and 395 configuring the display panels 360, 370, 380, and 390. Accordingly, it is possible to provide a display device which provides a touch input function and is thin.

The positions at which the touch sensors 364, 374, 376, 384, and 394 are formed may be variously changed as illustrated in FIGS. 40, 41, 42, and 43.

Figure 44:
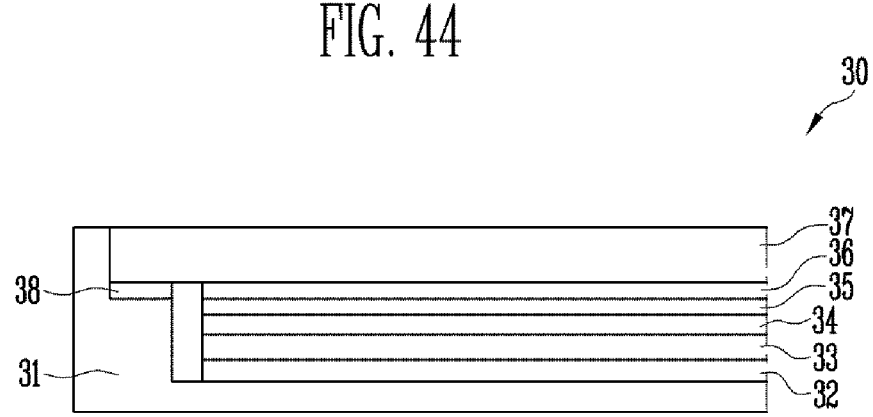
FIG. 44 is a diagram illustrating a touch sensor and integrated display panel according to an exemplary embodiment of the inventive concepts.

FIG. 44 is a diagram illustrating a touch sensor and integrated display panel according to an exemplary embodiment of the inventive concepts.

Referring to FIG. 44, a touch sensor integrated display device 30 may include a bracket 31, a buffer member 32 sequentially accommodated in the bracket 31, a display panel 33, a touch sensor 34, a polarizing plate 35, an adhesive layer 36, a window 37, and an adhesive 38 for fixing the window 37 to the bracket 31.

Depending on an exemplary embodiment, one or more constituent elements, except for the display panel 33 and the touch sensor 34, among the constituent elements illustrated in FIG. 44 may also be omitted.

FIG. 44 illustrates the exemplary embodiment in which the touch sensor 34 is disposed on the display panel 33 as an example of the touch sensor integrated display device 30. However, the inventive concepts are not limited thereto, and the position of the touch sensor 34 may be variously changed.

In order to make a relative positions of the respective constituent elements clear, FIG. 44 illustrates the display panel 33 and the touch sensor 34 as separate constituent elements, but the inventive concepts are not limited thereto.

For example, the touch sensor 34 may be implemented by using the separate substrates 301, 331, 341, and 351 as the base substrates like the exemplary embodiments illustrated in FIGS. 33, 34, 35A, 35B, 36, 37A, 37B, 38, and 39, or the display panel 33 and the touch sensor 34 may be integrated like the exemplary embodiments illustrated in FIGS. 40, 41, 42, and 43.

Alternatively, the touch sensor 34 may be integrated with the window 37. The touch sensor 34 may be formed on a lower surface of the window 37.

Within the touch sensor integrated display device 30, a position of the touch sensor 34 or a constituent element integrated with the touch sensor 34 may be variously changed.

In the touch sensor integrated display device 30, the touch sensor 34 may be implemented so that at least some of the constituent elements include the variable resistance elements in at least some areas like the exemplary embodiments illustrated in FIGS. 33, 34, 35A, 35B, 36, 37A, 37B, 38, and 39.

Accordingly, it is possible to provide the touch sensor integrated display device 30, which is capable of sensing a change in capacitance and a touch pressure from the outside according to a touch input.

The controller 135, controller 235, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, controller 135, controller 235, and/or one or more components thereof may include or otherwise be associated with one or more memories (not shown) including code (e.g., instructions) configured to cause the controller 135, controller 235, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concepts are not limited to such embodiments, but rather to the scope of the appended claims and various modifications and equivalent arrangements known to the skilled artisan.

What is claimed is:

1. A display device, comprising:
   a display panel comprising a display area; and
   a sensor configured to sense a pressure of a touch, the sensor being overlapped with the display area of the display panel,
   wherein the sensor comprises:
   a first conductor comprising metal lines forming openings;
   a second conductor spaced apart from the first conductor, and configured to form capacitance with the first conductor;
   an elastic buffer member disposed between the first conductor and the second conductor; and
   one or more variable resistance elements connected with the first conductor,
   wherein sizes of the openings gradually decrease in a direction from a center of the display area to a non-display area.

2. The display device of claim 1, wherein a resistance of at least one of the variable resistance elements and the capacitance are changed in accordance with the pressure applied by the touch.

3. The display device of claim 1, wherein the one or more variable resistance elements are positioned on the first conductor.

4. The display device of claim 3, wherein the one or more of the variable resistance elements are positioned between the first conductor and the second conductor.

5. The display device of claim 3, wherein the first conductor is positioned between the one or more variable resistance elements and the second conductor.

6. The display device of claim 1, wherein at least some of the variable resistance elements are provided on a same layer as that of the first conductor.

7. The display device of claim 1, wherein the one or more variable resistance elements comprise nano particles.

8. The display device of claim 7, wherein the nano particle comprises at least one of a nano column, a nano rod, a nano pore, and a nano wire.

9. The display device of claim 1, wherein the one or more variable resistance elements comprise at least one of a silver nano wire and a carbon nano tube.

10. The display device of claim 1, wherein the first conductor has a mesh structure.

11. The display device of claim 1, wherein the metal lines comprise a first metal line and a second metal line which are spaced apart from each other, and
    the one or more variable resistance elements are connected between the first metal line and the second metal line.

12. The display device of claim 1, wherein the display panel comprises a first surface, and
    a second surface opposite to the first surface, and the sensor is positioned on the first surface of the display panel.

13. The display device of claim 12, wherein the display panel displays an image through the first surface.

14. The display device of claim 1, wherein the elastic buffer member comprises a plurality of sub-buffer members which are separate from each other.

15. The display device of claim 1, wherein the variable resistance elements number two or more.

16. The display device of claim 15, wherein the variable resistance elements are disposed along an edge of the first conductor.

17. The display device of claim 15, wherein the variable resistance elements are regularly disposed in the first conductor.

18. The display device of claim 15, wherein the variable resistance elements are irregularly disposed in the first conductor.

19. The display device of claim 15, wherein the variable resistance elements are disposed in the first conductor along a non-linear path.

20. The display device of claim 1, further comprising:
a bracket configured to accommodate the display panel and the sensor,
wherein the second conductor is a part of the bracket accommodating the display panel and the sensor.

* * * * *